(12) United States Patent
Mori

(10) Patent No.: US 6,837,826 B2
(45) Date of Patent: Jan. 4, 2005

(54) APPARATUS AND A METHOD FOR CONTROLLING AN ENGINE WITH AN AUTOMATIC TRANSMISSION

(75) Inventor: Kouichi Mori, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/285,500

(22) Filed: Nov. 1, 2002

(65) Prior Publication Data

US 2003/0083176 A1 May 1, 2003

(30) Foreign Application Priority Data

Nov. 1, 2001 (JP) .......................................... 2001-336725
Feb. 19, 2002 (JP) .......................................... 2002-042031

(51) Int. Cl.$^7$ ............................................... F16H 59/56
(52) U.S. Cl. ........................................ 477/102; 477/106
(58) Field of Search ............................... 477/101, 102, 477/103, 104, 105, 106

(56) References Cited

U.S. PATENT DOCUMENTS 4,513,718 A * 4/1985 Ishii et al. .............. 123/406.36
4,671,235 A * 6/1987 Hosaka ....................... 123/352

FOREIGN PATENT DOCUMENTS

| JP | 59-165865 | * | 9/1984 | ............ 123/406.51 |
| JP | 01-104972 | * | 4/1989 | |
| JP | 01-273736 | * | 11/1989 | ................. 477/902 |
| JP | 02-027163 | * | 1/1990 | ............ 123/406.66 |
| JP | 02-157436 | * | 6/1990 | ................. 180/179 |
| JP | 3-185269 A | | 8/1991 | |

* cited by examiner

Primary Examiner—Ha Ho
(74) Attorney, Agent, or Firm—Foley & Lardner LLP

(57) ABSTRACT

In an engine with an automatic transmission having a lock-up mechanism, engine ignition timing is retarded more for a predetermined period immediately after a lock-up than the engine ignition timing normally set based upon an engine operating condition when a lock-up control is performed. Thereby, a knocking occurrence immediately after the lock-up is properly prevented.

9 Claims, 42 Drawing Sheets

(L/UP COMPLETION)

(L/UP COMPLETION)

(L/UP COMPLETION)

(L/UP COMPLETION)

(L/UP COMPLETION)

(L/UP COMPLETION)

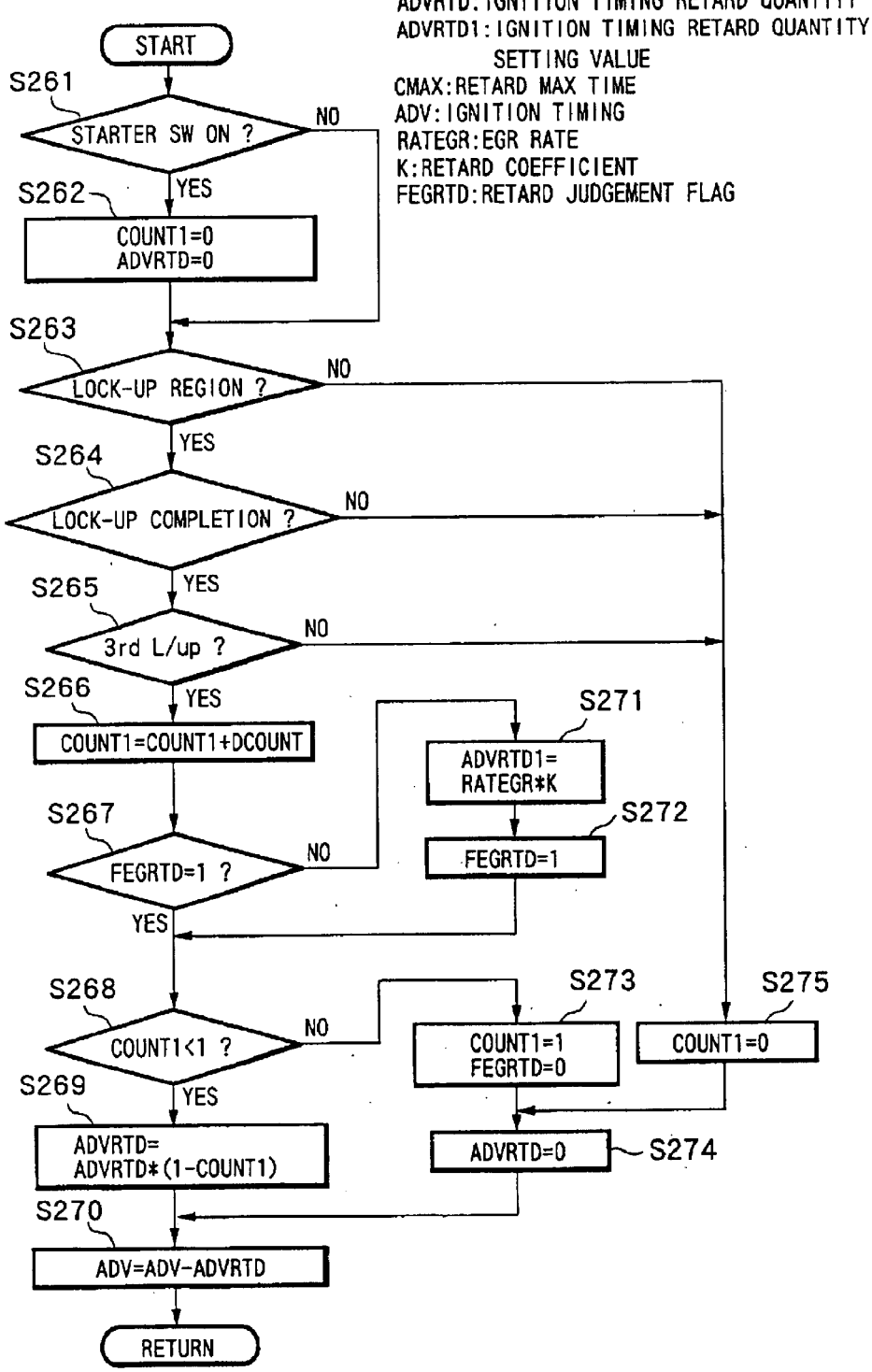

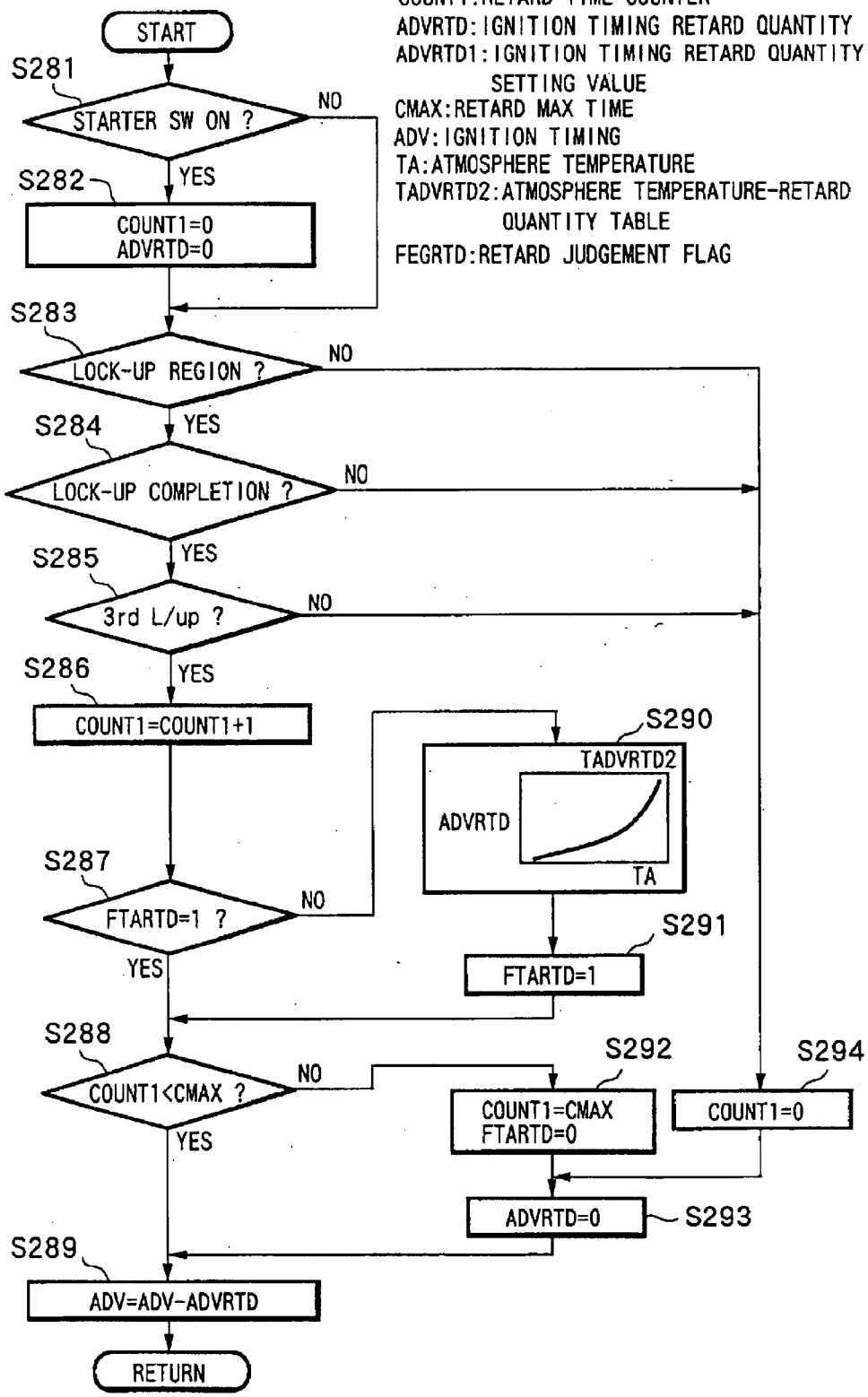

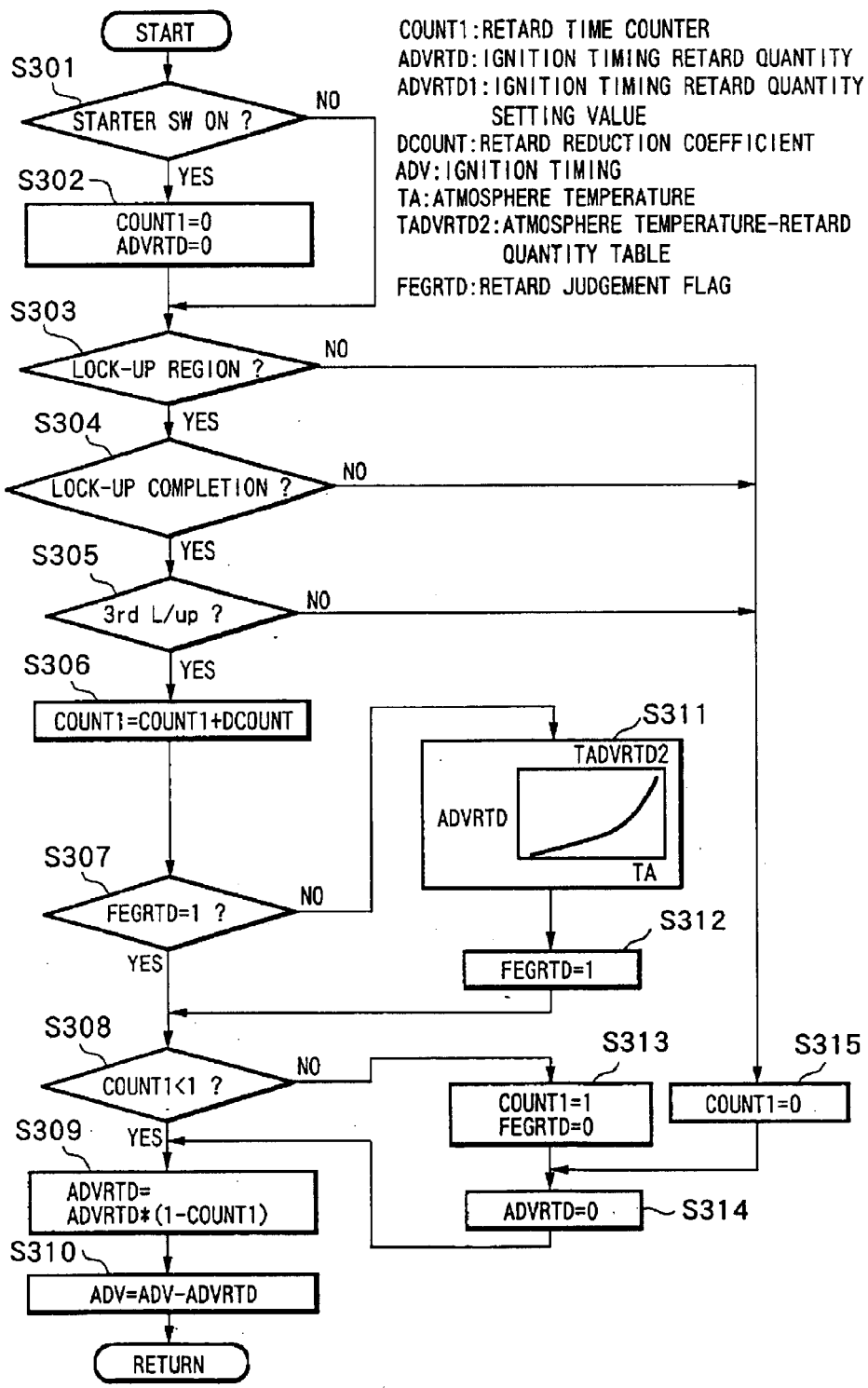

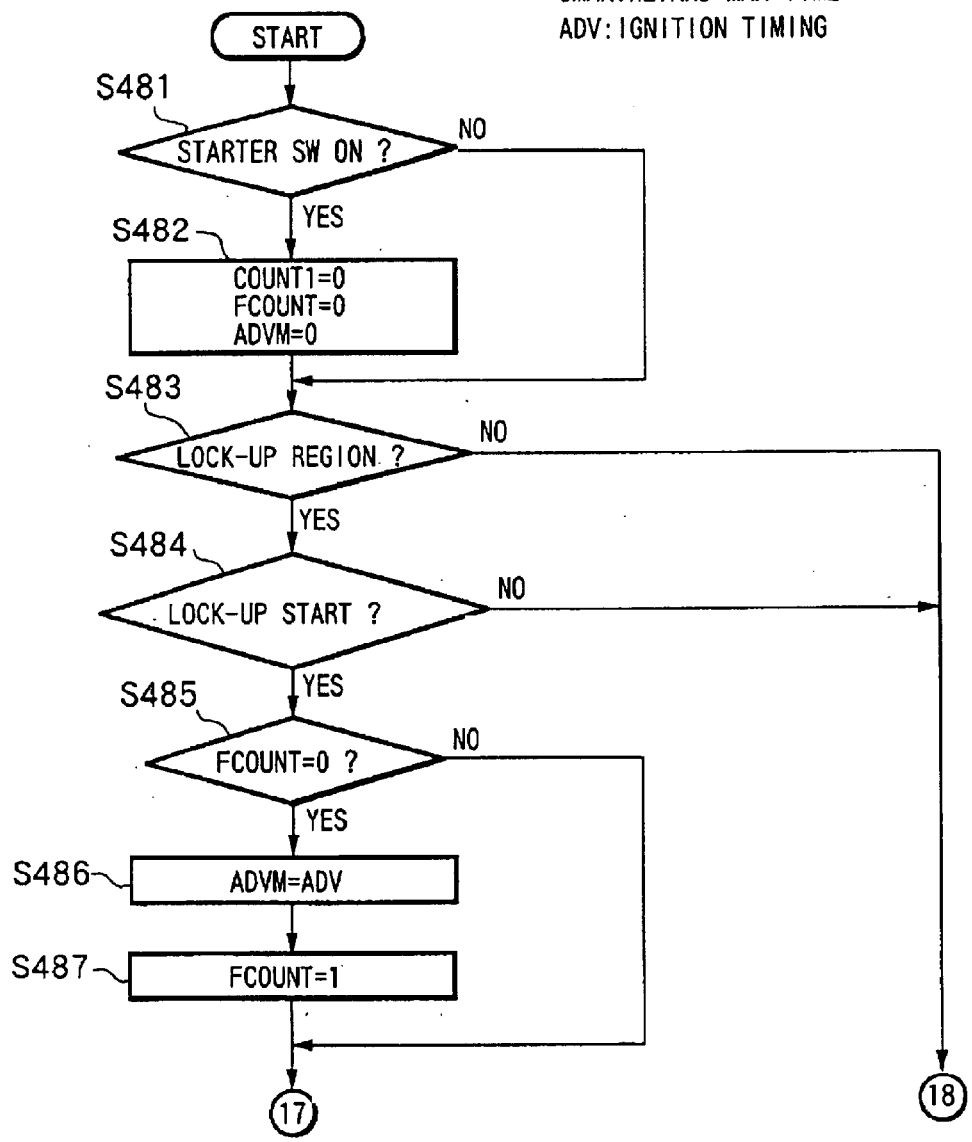

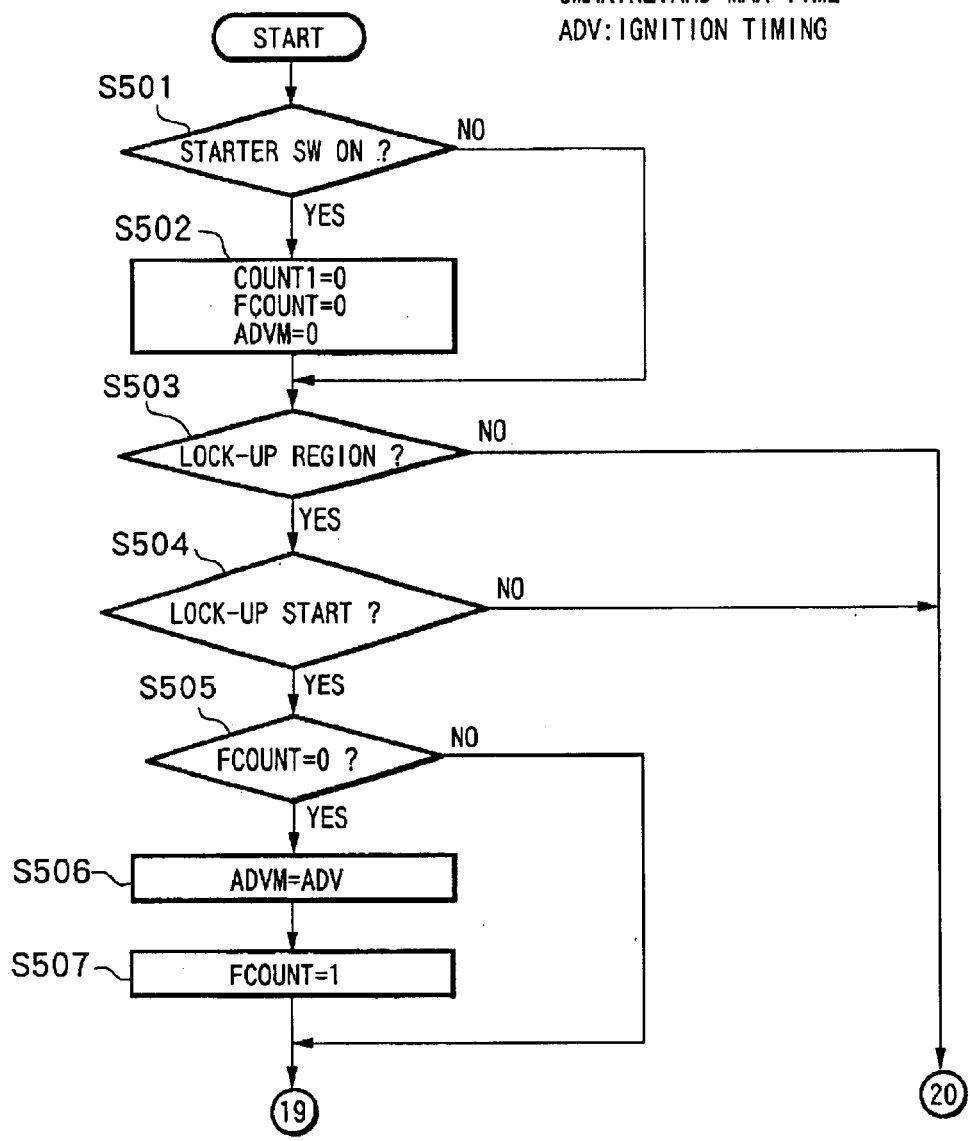

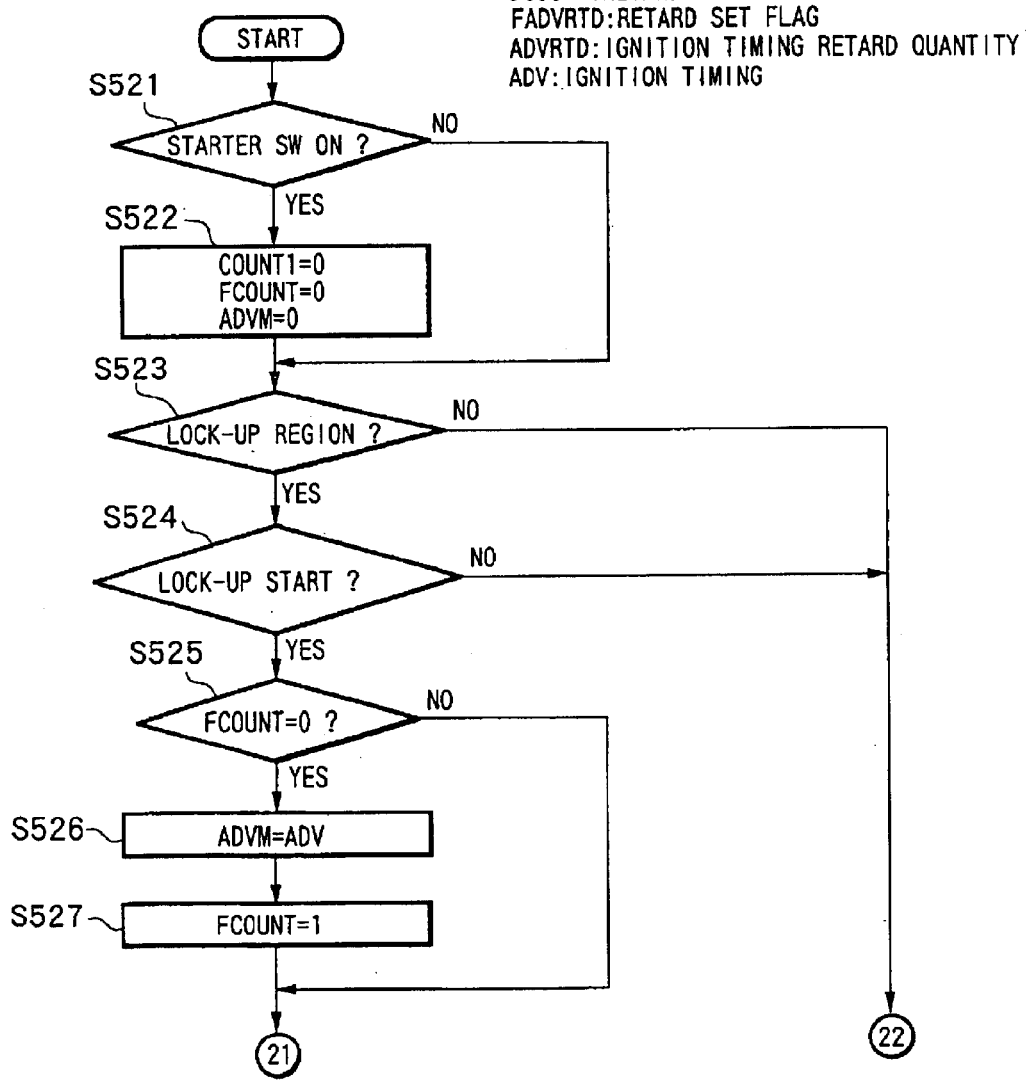

APPARATUS AND A METHOD FOR CONTROLLING AN ENGINE WITH AN AUTOMATIC TRANSMISSION

FIELD OF THE INVENTION

The present invention relates to an apparatus and a method for controlling an engine with an automatic transmission and particularly to a technology of preventing an occurrence of knocking immediately after a lock-up band completion.

BACKGROUND OF THE INVENTION

There is known a lock-up control as an earlier technology which directly connects an output shaft of a torque converter and an input shaft thereof at a predetermined engine operating condition to eliminate a transmission loss in an automatic transmission and improve a fuel economy. A Japanese Unexamined Patent Publication 3-185269 discloses a torque down control in a lock-up technology by which a jolt due to a difference in torque levels between the input shaft and the output shaft of the torque converter at a lock-up timing is reduced and a shift time of a lock-up is shortened.

This torque down control is performed by retarding ignition timing during a lock-up transition state from after a lock-up control start to before a lock-up completion.

However, the above technology raises the following problem because the ignition timing is retarded by a constant retard quantity during the lock-up transition state.

In an engine wherein the lock-up is performed not only at a fourth gear shift but also at a relatively low vehicle speed, low engine rotation speed, and high load region such as at a third gear shift, when the lock-up is performed at the third gear shift, decrease of an engine rotation speed and increase of an engine load due to the lock-up control change more rapidly, thereby bringing about combustion instability right after the lock-up and a temporal knocking thereafter.

On this occasion, in order to avoid the occurrence of the knocking immediately after the lock-up, it is necessary during the lock-up transition state immediately before the lock-up to, in advance, set retard of ignition timing at engine operating regions in an ignition timing table wherein the knocking occurs immediately after the lock-up and as a result, there is a problem that an engine torque is lowered at the engine operating conditions having the retarded ignition timing.

SUMMARY OF THE INVENTION

As one aspect, the present invention, in view of the foregoing problems, provides an apparatus and a method for controlling an engine with an automatic transmission which effectively prevents an occurrence of knocking immediately after a lock-up control.

The present invention, in order to solve the above problems, includes an apparatus and a method for controlling an engine with an automatic transmission which performs a lock-up control for directly connecting an input shaft of a torque converter to an output shaft thereof at a predetermined condition wherein engine ignition timing is set based upon an engine operating condition detected and on the other hand, the engine ignition timing is corrected to be retarded during a predetermined period immediately after the lock-up.

The other objects and features of this invention will be understood from the following description with accompanying drawings.

BRIEF EXPLANATION OF THE DRAWINGS

FIG. 18 is a flowchart showing a fourteenth embodiment thereof.

FIG. 19 is a flowchart showing a fifteenth embodiment thereof.

FIG. 20 is a flowchart showing a sixteenth embodiment thereof.

FIG. 29A and FIG. 29B are a flowchart showing a twenty fifth embodiment thereof.

FIG. 30A and FIG. 30B are a flowchart showing a twenty sixth embodiment thereof.

FIG. 31A and FIG. 31B are a flowchart showing a twenty seventh embodiment thereof.

DETAILED DESCRIPTION OF THE EMBODIMENTS

Figure 1A:
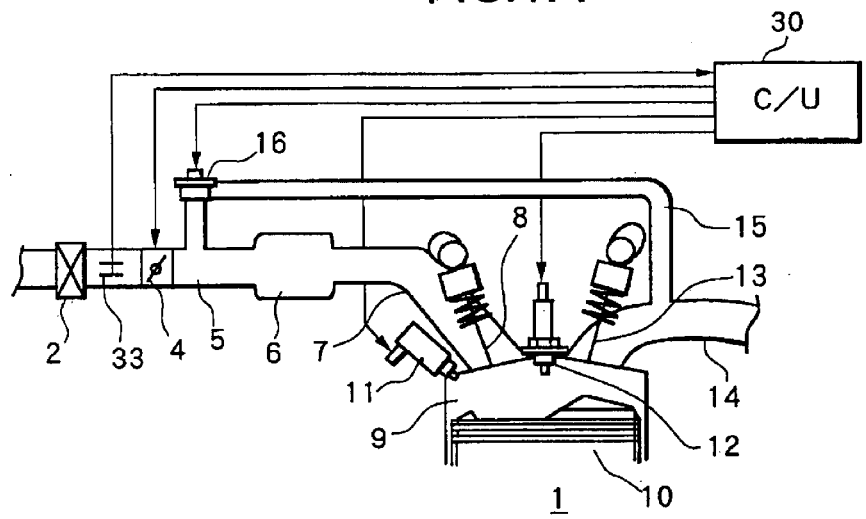
FIG. 1A and FIG. 1B are system views according to an embodiment of the invention.
Figure 1B:
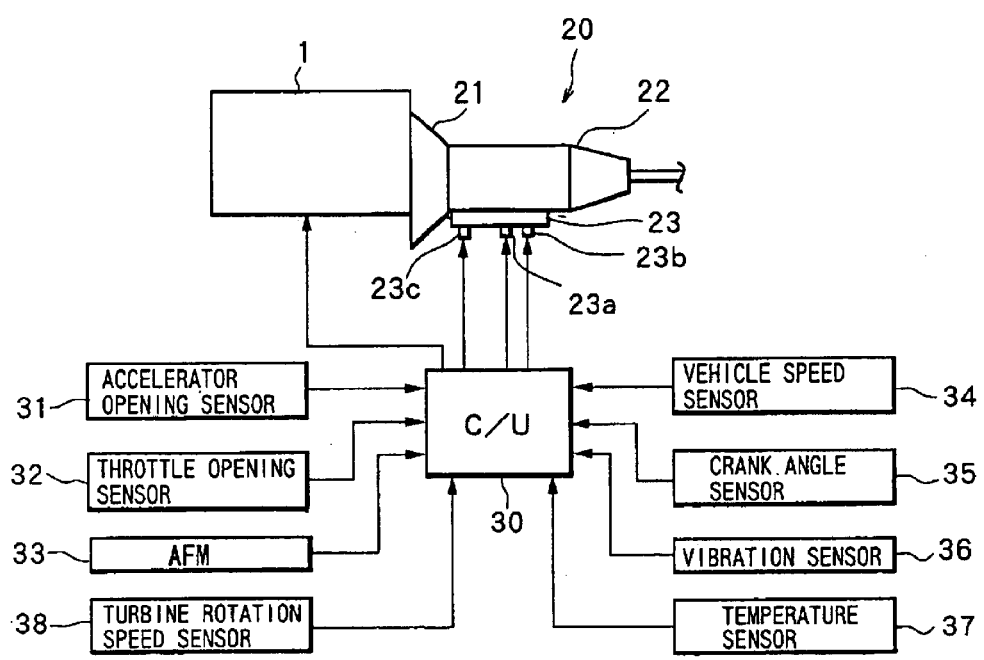

Embodiments according to the invention will be explained in reference to accompanying drawings. FIG. 1A and FIG. 1B are system views showing an embodiment according to the invention. In FIG. 1A, air sucked into an engine 1 for a vehicle passes through an air cleaner 2 and afterwards is measured in an airflow meter AFM 33 and is led to an electrically controlled throttle valve 4 wherein an intake air quantity control is performed.

The sucked air, afterwards, passes through an intake passage 5, a collector 6, and an intake manifold 7 and is introduced into a cylinder 9 via an intake valve 8. A piston which conducts a reciprocal movement is disposed inside cylinder 9.

A fuel is injected by a fuel injection valve 11 into the air introduced in cylinder 9 to form a mixture. The mixture is compressed by piston 10 and is ignited by an ignition plug 12. Combustion exhaust gases are discharged into an exhaust manifold 14 through an exhaust valve 13. An EGR passage 15 is associated with exhaust manifold 14 and part of the exhaust gases is recirculated to intake passage 5. This recirculation quantity (EGR flow quantity) is controlled by an EGR valve 16 disposed in EGR passage 15.

An automatic transmission 20 is disposed on an output side of engine 1 as shown in FIG. 1B. Automatic transmission 20 is equipped with a torque converter 21 disposed on the output side of engine 1, a transmission 22 connected to engine 1 by torque converter 21, and an oil pressure actuator 23 which performs band and release control of various gear shift elements (clutches and so on) in transmission 22. An operating oil pressure to oil pressure actuator 23 is controlled through various electromagnetic valves (not shown) and herein a shift solenoid 23a, 23b for an automatic gear shift and a lock-up solenoid 23c only are shown.

A control unit (C/U) 30 receives signals from air flow meter AFM 33, an accelerator opening sensor 31 which detects an accelerator opening degree, a throttle opening sensor 32 which detects a throttle opening degree TVO, a vehicle speed sensor 34 which detects a vehicle speed VSP, a crank angle sensor 35 which detects a rotation position of a crank shaft, a vibration sensor 36 which detects a pressure fluctuation in a combustion chamber of engine 1 as a vibration of an engine block, a temperature sensor 37 which detects an outside temperature, a turbine rotation speed sensor 38 which detects a turbine rotation speed of torque converter 21 and so on.

Control unit 30 sets a fuel injection quantity Tp, a fuel injection timing IT, and ignition timing ADV to engine 1 by performing predetermined calculation processes based upon these input signals, as well as sets a target EGR rate (remaining gas rate), wherein electrically controlled throttle valve 4 and EGR valve 16 are controlled for this target EGR rate, and fuel economy and exhaust gas performances are improved.

Control unit 30 retrieves a table set in advance based upon the throttle opening degree TVO and the vehicle speed VSP to determine an optimal gear shift range and drives shift solenoid 23a, 23b for the determined gear shift range and further judges whether or not a vehicle running condition is at a predetermined lock-up region and in case of its being at the predetermined lock-up region, lock-up solenoid 23c is controlled to perform the lock-up control which directly connects the input shaft of torque converter 21 to the output shaft thereof.

Figure 2:
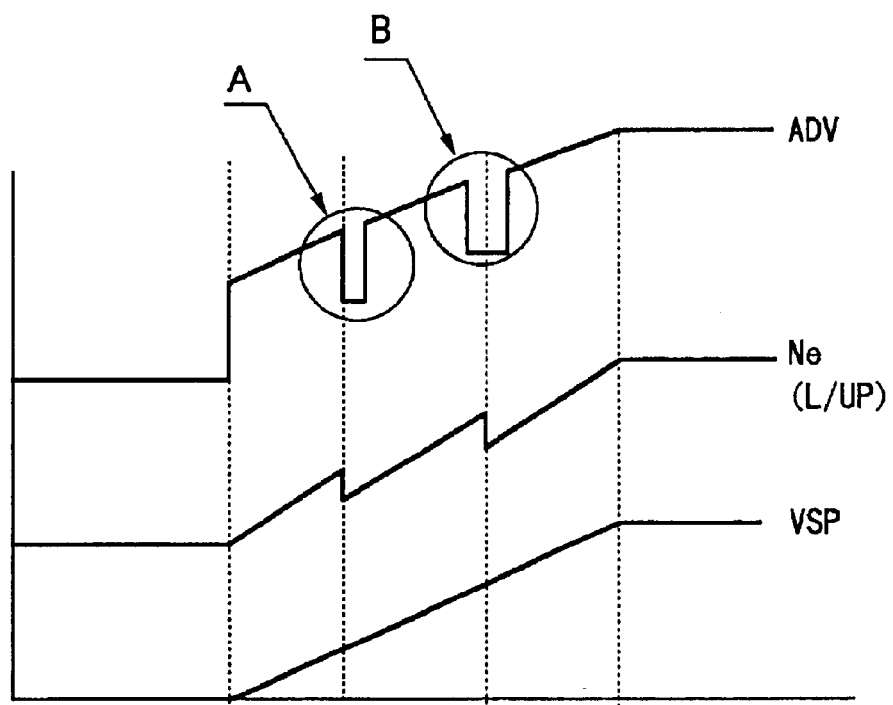
FIG. 2 is a view showing a relationship of a vehicle speed VSP, an engine rotation speed Ne, and ignition timing ADV.

Control peculiar in the embodiment will now be explained. In the embodiment, as shown in FIG. 2, when the lock-up control is performed in the relatively low vehicle speed, low rotation, and high load condition such as at a third gear shift, during a predetermined period immediately after a lock-up (immediately after a lock-up band completion), a retard correction control of ignition timing ADV is performed (see A portion in FIG. 2). This is to avoid a knocking temporarily occurring due to a combustion instability and a rapid combustion fluctuation which might otherwise take place immediately after the lock-up.

Figure 3A:
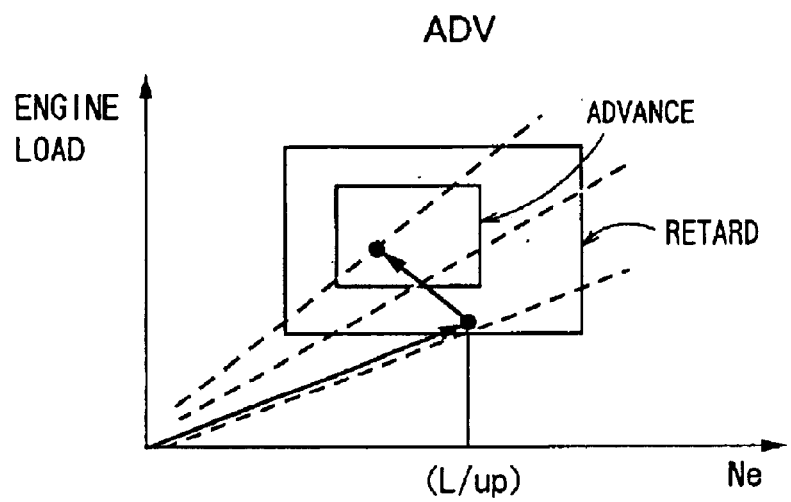
FIG. 3A and FIG. 3B are views showing variations in the ignition timing and in a target EGR rate after and before a lock-up control.
Figure 3B:
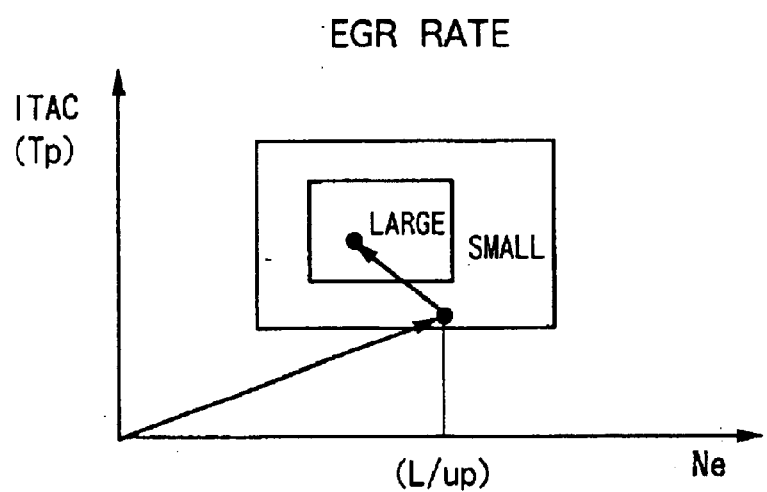

In detail, an engine operating condition immediately after the lock-up at an acceleration time is a lower rotation and higher load than immediately before the lock-up. Therefore, as an engine control, as shown in FIG. 3A, demand ignition timing AVD is retarded and as a result, it might bring about the combustion instability due to the rapid rotation speed reduction and the load increase and the occurrence of the knocking. As shown in FIG. 3B, an EGR rate (remaining gas rate) is made also to be increased, but since an actual remaining gas rate does not change immediately, the actual remaining gas rate is transitionally different from a target value (target EGR rate), and therefore, the knocking may occur due to the rapid combustion fluctuation.

In this embodiment, such knocking occurrence is not avoided by, in advance, retarding ignition timing at an engine operating condition wherein the knocking occurs or by, in advance, reducing the target EGR rate, but by performing the retard correction control of the ignition timing ADV during a predetermined period immediately after the lock-up. Accordingly, the knocking can be avoided without an unnecessary toque reduction, and deterioration of a fuel economy and an exhaust gas performance.

If necessary, both the retard correction control of the ignition timing ADV performed immediately after the lock-up and the retard correction control of the ignition timing ADV performed at a lock-up transition state for a jolt reduction at the lock-up are used (see B portion in FIG. 2). In this case, an example of the retard correction control of the ignition timing is shown in FIG. 4 corresponding to an enlarged view of the B portion in FIG. 2.

Figure 4A:
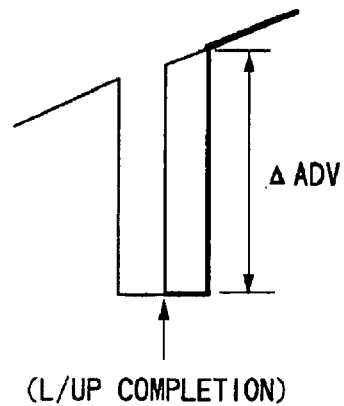
FIG. 4A to FIG. 4F are views showing states of a retard correction control of the ignition timing immediately after the lock-up control.
Figure 4B:
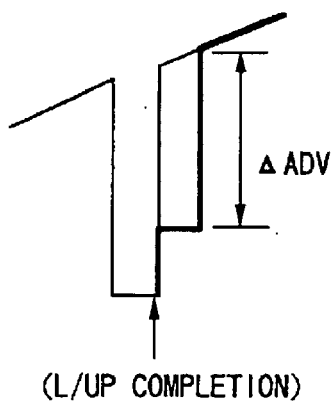

FIG. 4A is a case wherein ignition timing retarded during the lock-up transition state is kept immediately after the lock-up (hereinafter, described as a first retard correction control). FIG. 4B is a case wherein ignition timing advanced by a small margin from the ignition timing retarded during the lock-up transition state is set immediately after the lock-up (hereinafter, described as a second retard correction control).

Figure 4C:
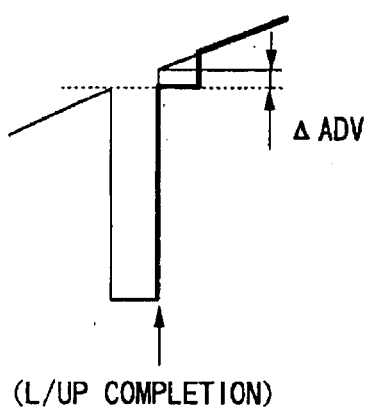
Figure 4D:
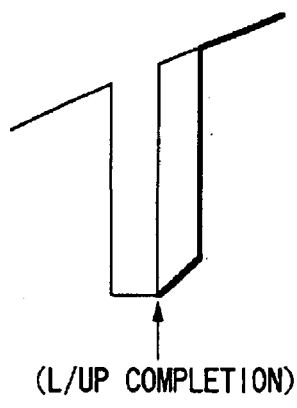
Figure 4E:
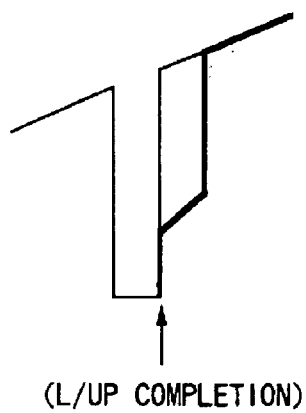

FIG. 4C is a case wherein ignition timing immediately before the lock-up is stored and this stored ignition timing is set as ignition timing immediately after the lock-up. FIG. 4D is a case wherein ignition timing retarded immediately during the lock-up transition state is kept immediately after the lock-up and is gradually advanced as time after the lock-up goes by (retard correction quantity is reduced) (hereinafter, described as a fourth correction control). FIG. 4E is a case wherein ignition timing advanced by a small margin from the ignition timing retarded during the lock-up transition state is set immediately after the lock-up and this set ignition timing is gradually advanced as time goes by (hereinafter, described as a fifth retard correction control).

Figure 4F:
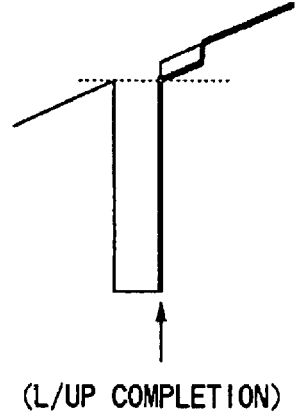

FIG. 4F is a case wherein ignition timing immediately before the lock-up is memorized and this memorized ignition timing is set as ignition timing immediately after the lock-up and this set ignition timing is gradually advanced as time goes by (hereinafter, described as a sixth retard correction control). The lock-up transition state and the lock-up completion are judged by detecting a difference between an engine rotation speed Ne and a turbine rotation speed Nt of torque converter 21 based upon signals from crank angle sensor 35 and turbine rotation speed sensor 38. Control unit 30 includes a timer therein and counts an elapse time from the lock-up completion.

Figure 5:
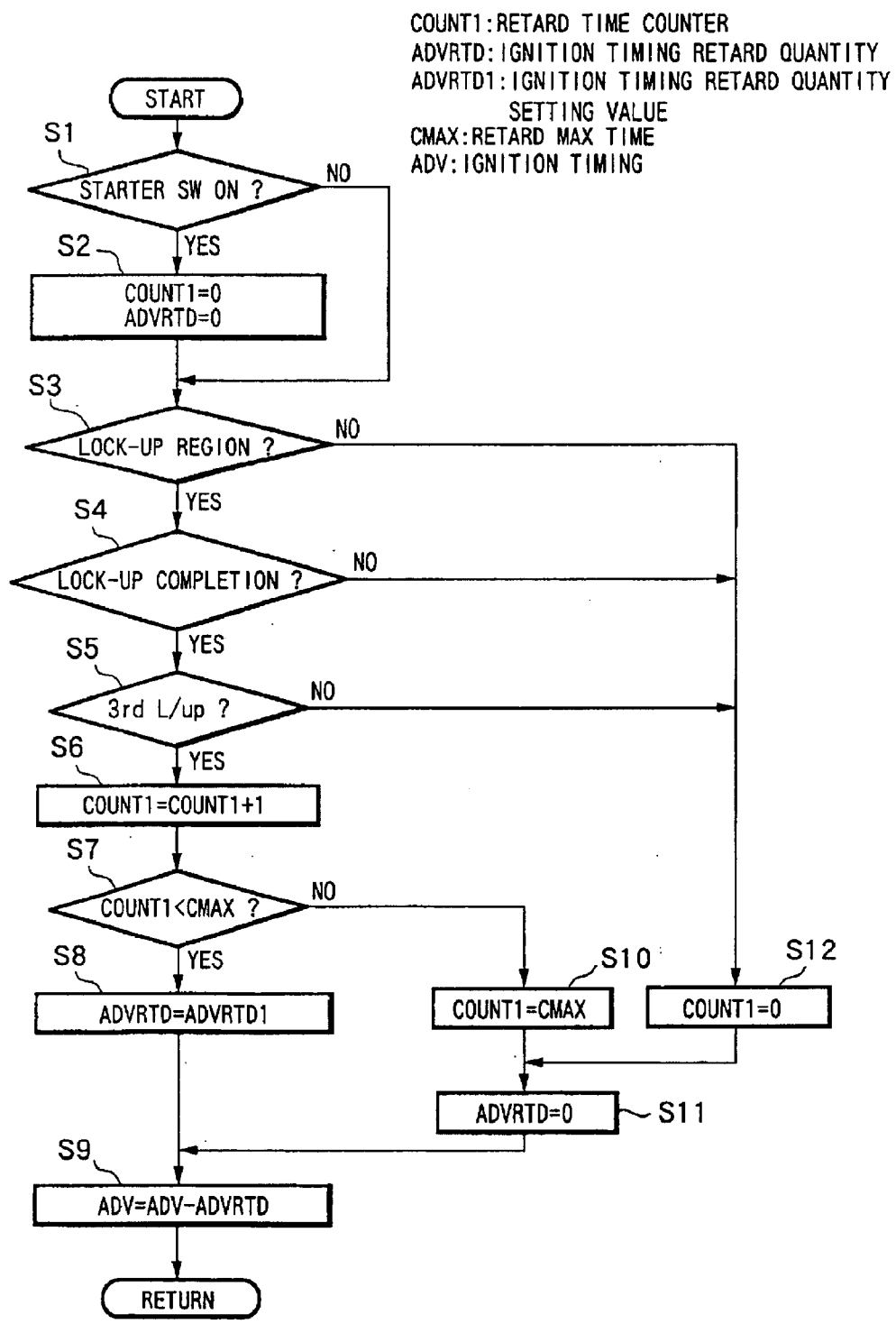
FIG. 5 is a flowchart showing a first embodiment of the retard correction control of the ignition timing immediately after the lock-up control.

The retard correction control of the ignition timing ADV performed immediately after the lock-up will be explained as follows. FIG. 5 is a flowchart showing a first embodiment wherein a retard correction of ignition timing immediately after the lock-up is performed by a setting value ADVRTD1 of ignition timing retard quantity set in advance.

FIG. 5, at S1, it is judged whether or not a starter switch is on. When it is on, the process goes to S2 wherein, an initial setting of time COUNT1 (described as retard continuing time count value) to perform a retard correction of the ignition timing and an ignition timing retard quantity ADVRTD is made. On the other hand, when it is not on, the process goes to S3 because the initial setting is already made.

At S3, it is judged whether or not a vehicle running state is in a lock-up region. This judgement is made in reference to a lock-up region map set in advance based upon a throttle opening degree TVO and a vehicle speed VSP detected. When the running state is in the lock-up region, the process goes to S4 and when it is not in the lock-up region, the retard continuing time count value COUNT1 and the ignition timing retard quantity ADVRTD are set as 0 (S12→S11→S9). At S4, it is judged whether or not a lock-up band of torque converter 21 is completed. This judgement is made by detecting the difference between engine rotation speed Ne and the turbine rotation speed Nt of torque converter 21 as described above.

When the lock-up is completed, the process goes to S5 and when it is not completed, the retard continuing time count value COUNT1 and the ignition timing retard quantity ADVRTD are set as 0 (S12→S11→S9). At S5, it is judged whether or riot the completed lock-up is a lock-up at a third gear shift ($3^{rd}$ L/up in FIG. 5). When the third lock-up is completed, the process goes to S6 wherein the retard continuing time count value COUNT1 is counted up. On the other hand, when the completed lock-up is not the third lock-up, the retard continuing time count value COUNT1 and the ignition timing retard quantity ADVRTD are set as 0 (S12→S11→S9).

At S7, it is judged whether or not the retard continuing time count value COUNT1 is smaller than a retard maximum time count value CMAX. The retard maximum time value CMAX used is set in advance as a value corresponding to a period of time (an effective time for limiting an occurrence of knocking) during which the retard correction of the ignition timing immediately after the lock-up is required. When the retard continuing time count value COUNT1 is smaller than the retard maximum time count value CMAX, the process goes to S8.

On the other hand, when the retard continuing time count value COUNT1 is larger than the retard maximum time count value CMAX, the retard continuing time count value COUNT1 is set as CMAX and the retard quantity ADVRTD of the ignition timing is set as 0 (S10→S11→S9). At S8, the ignition timing retard quantity ADVRTD is set as a setting value ADVRTD1 of the ignition timing set in advance.

At S9, a retard correction of the ignition timing is performed by subtracting the ignition timing retard quantity ADVRTD from the set ignition timing ADV. Accordingly, when the ignition timing retard correction quantity ADVRTD is 0, the retard correction of the ignition timing is not made. As described above, the knocking occurring due to combustion instability generating immediately after the lock-up can be avoided. Since a period of time to perform the retard correction of the ignition timing is set as the time to effectively avoid the knocking, performing the retard correction over a period of time longer than necessary is prevented and therefore, a torque reduction and a fuel economy deterioration due to the retard correction of the ignition timing are restricted. When the setting value ADVRTD1 of the ignition timing retard quantity is the same as the ignition timing retarded at the lock-up transition state, the first retard correction control is performed (see FIG. 4A), and in case the setting value ADVRTD1 of the ignition timing retard quantity is advanced by a smaller margin than the ignition timing retarded during the lock-up transition state, the second retard correction control is performed (see FIG. 4B).

Figure 6:
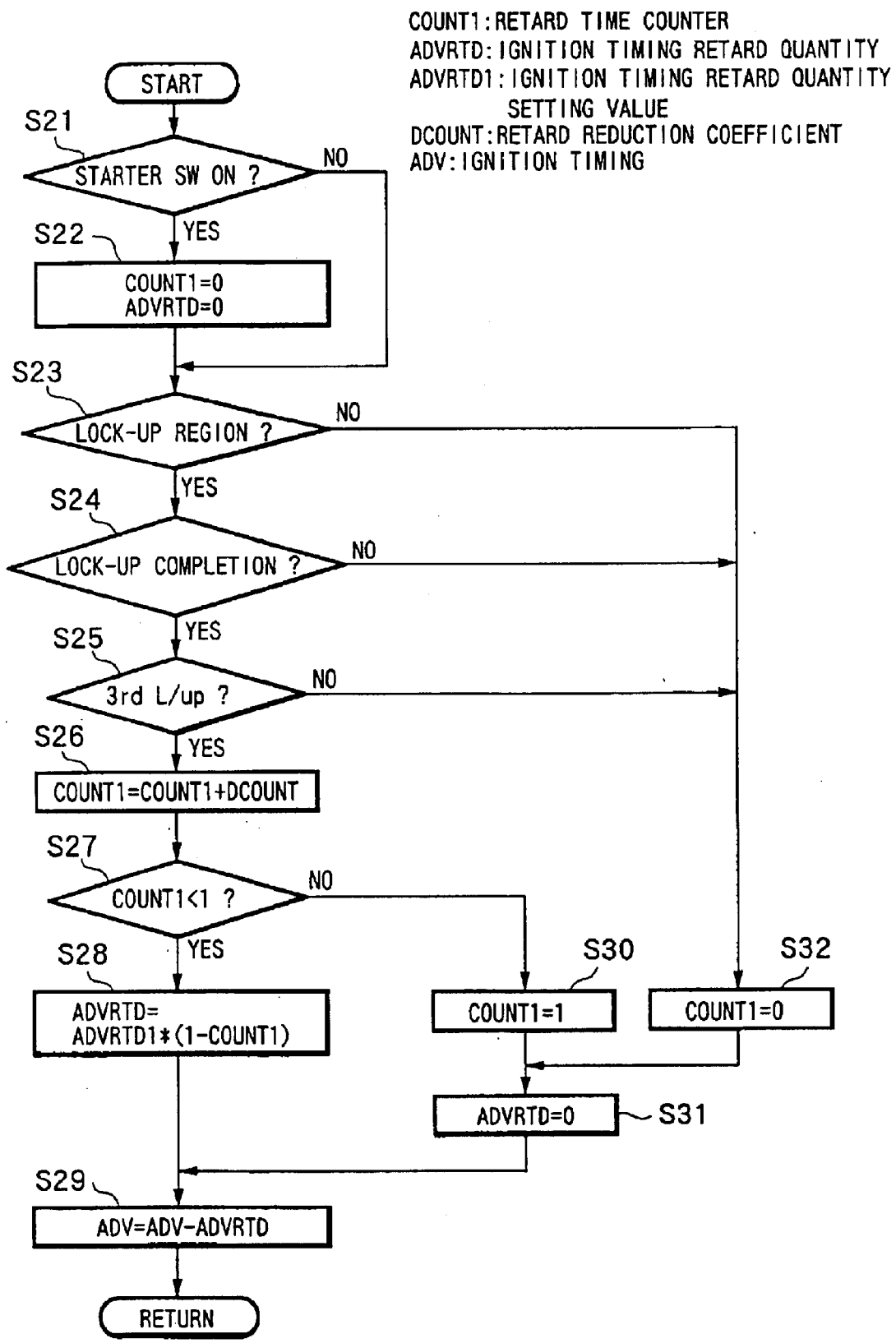
FIG. 6 is a flowchart showing a second embodiment thereof.

FIG. 6 is a flowchart showing a second embodiment and differs from the first embodiment in reducing a retard correction quantity of the ignition timing corresponding to an elapse time from the lock-up completion. In this embodiment, the retard maximum time count value CMAX is set as 1. At S21~S25 is the same as S1~S5 in the first embodiment (FIG. 5). At S26, a retard reduction coefficient DCOUNT (0<DCOUNT<1) is added to the retard continuing time count value COUNT1. At S27, it is judged whether or not the retard continuing time count value COUNT1 is smaller than 1 (the retard maximum time count value CMAX).

When the retard continuing time count value COUNT1 is smaller than 1, the process goes to S28. On the other hand, when the retard continuing time count value COUNT1 is more than 1, the retard continuing time count value 1 is set as 1 and the ignition timing retard quantity ADVRTD is set as 0 (S30→S31→S29). At S28, the ignition timing retard quantity ADVRTD is calculated. In detail, it is calculated by multiplying the setting value ADVRTD1 of the ignition timing retard quantity and (1 minus the retard continuing time count value COUNT1).

At S29, the retard correction of the ignition timing is performed by subtracting the ignition timing retard quantity ADVRTD calculated at S28 from ignition timing ADV (reference to a map) regularly set. Accordingly, the knocking occurrence immediately after the lock-up can be avoided and also the difference in the torque levels at a completion of the ignition timing retard correction control performed for avoiding the knocking can be restricted, and thereby, a driveability improves.

In this embodiment, when the setting value ADVRTD1 of the ignition timing retard quantity is the same as the ignition timing retarded during the lock-up transition state for restricting the jolt at the lock-up timing, the control technique is the fourth retard correction control (see FIG. 4D) and when the ignition timing is advanced by a smaller margin than the ignition timing retarded during the lock-up transition state, the control technique is the fifth retard correction control (see FIG. 4E).

Figure 7:
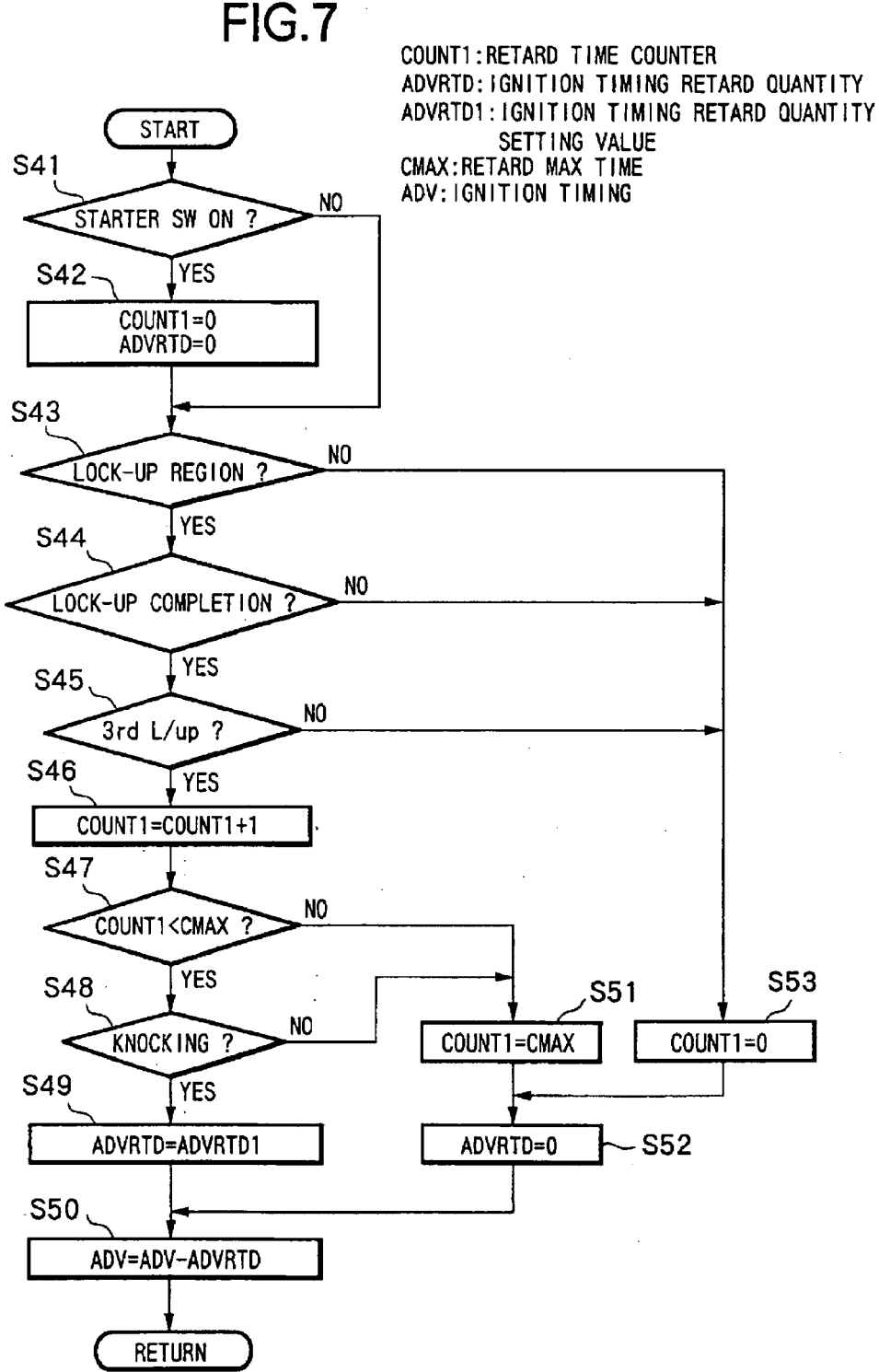
FIG. 7 is a flowchart showing a third embodiment thereof.

FIG. 7 is a flowchart showing a third embodiment which differs from the first embodiment in that it is judged whether or not a knocking occurs immediately after the lock-up and the retard correction of the ignition timing is made only when the knocking occurs. In FIG. 7, S41~S47 are the same as S1~S7 in the first embodiment (FIG. 5).

At S48, it is judged whether or not a knocking occurs. This judgement is made based upon whether or not a vibration of the engine block detected by vibration sensor 36 is over a predetermined threshold value. The knocking occurrence includes not only detection of an actual knocking occurrence but also a high possibility of the knocking occurrence (namely, prediction of the knocking occurrence based upon the vibration detected). When the knocking occurs, the process goes to S49 wherein the ignition timing retard quantity ADVRTD is set as the setting value ADVRTD1 of the ignition timing retard quantity set in advance. On the other hand, when the knocking does not occur, the retard continuing time count value COUNT1 is set as CMAX, and the ignition timing retard quantity ADVRTD is set as 0 (S51→S52→S50).

At S50, a retard correction is made by subtracting the ignition timing retard quantity ADVRTD from the set ignition timing ADV. Accordingly, a retard correction control of the ignition timing immediately after the lock-up is not indiscriminately performed, but instead it can be performed when necessary. Therefore, a torque reduction and a fuel economy deterioration due to the retard correction of the ignition timing can be minimized.

Figure 8:
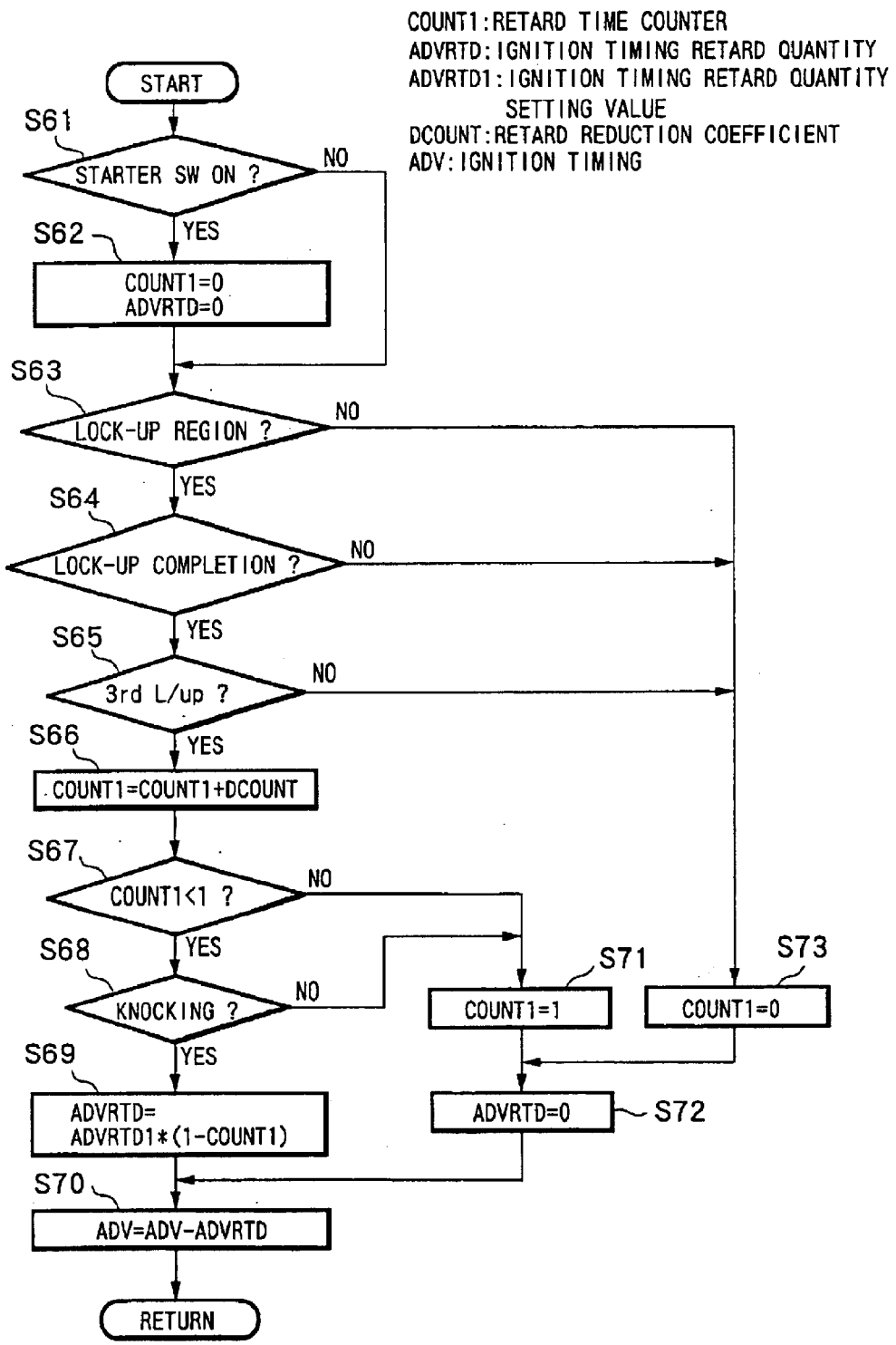
FIG. 8 is a flowchart showing a fourth embodiment thereof.

FIG. 8 is a flowchart showing a fourth embodiment and differs from the third embodiment in reducing a retard correction quantity of the ignition timing corresponding to an elapse time from the lock-up completion. In detail, S66, S67, and S69 are different from the third embodiment (FIG. 7) and the same as S26, S27, and S28 in the second embodiment (FIG. 6).

Accordingly, the effect of the third embodiment is maintained and at the same time a difference in the torque levels at a completion of the retard correction control of the ignition timing can be restricted.

Figure 9:
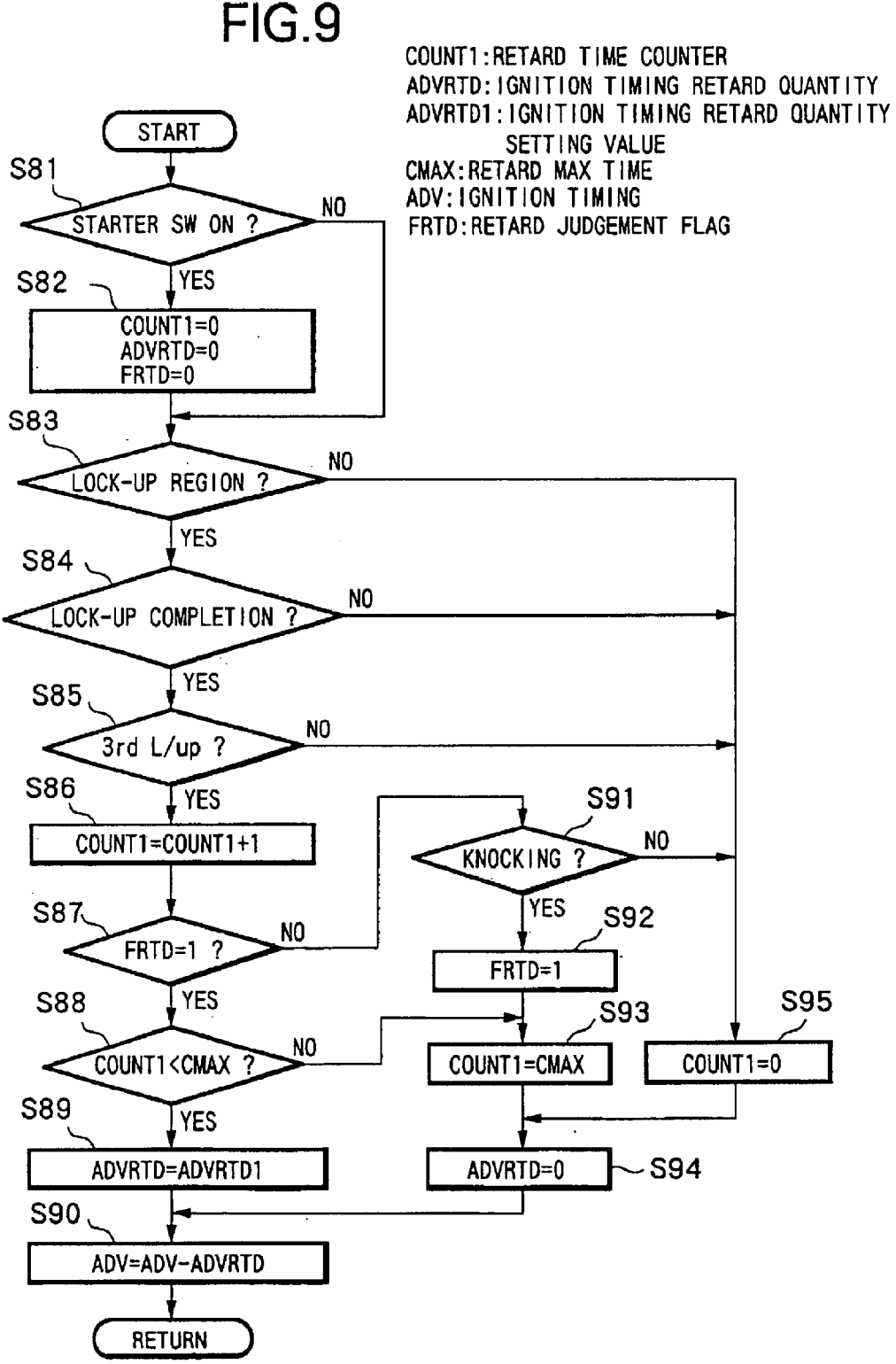
FIG. 9 is a flowchart showing a fifth embodiment thereof.

FIG. 9 is a flowchart showing a fifth embodiment which differs from the first embodiment in that it is judged whether or not a knocking occurs immediately after the lock-up and the retard correction of the ignition timing is made only at the knocking occurrence.

The fifth embodiment differs from the third embodiment in that a retard correction of the ignition timing is not made at a first knocking judgement but instead only a retard correction judgement flag (hereinafter, judgement flag) FRTD is set and following the first knocking judgement, the retard correction of the ignition timing is made by confirming the judgement flag FRTD only.

In FIG. 9, S81~S86 are the same as S1~S6 in the first embodiment (FIG. 5). In this embodiment, at S82, an initial setting of the judgement flag FRTD is made. At S87, it is judged whether or not the judgement flag is set (namely, FRTD=1). This judgement flag FRTD will be set at S92 described later and a knocking occurrence can be detected or estimated by confirming the judgement flag FRTD. When the judgement flag is 1, the process goes to S88 wherein it is judged whether or not the retard correction continuing time count value COUNT1 is smaller than the retard maximum time count value CMAX.

At S88, When the retard correction continuing time count value COUNT1 is smaller than the retard maximum time count value CMAX, the process goes to S89 wherein the ignition timing retard quantity ADVRTD is set as the setting value ADVRTD1 of the ignition timing retard quantity set in advance, and the process goes to S90 wherein a retard correction of the ignition timing is made.

On the other hand, when the retard correction continuing time count value COUNT1 is larger than the retard maximum time count value CMAX, the retard correction continuing time count value COUNT1 is set as CMAX and the retard quantity ADVRTD of the ignition timing is set as 0 (S93→S94→S90).

Back to S87, if the judgement flag FRTD is not set (namely, FRTD=0), the process goes to S91 wherein it is judged whether or not a knocking occurs the same as in the third embodiment. When the knocking occurs, the process goes to S92 wherein after the judgement flag is set (FRTD=1), the retard continuing time count value COUNT1 is set as CMAX and the ignition timing retard quantity ADVRTD is set as 0 ( S93→S94→S90). On the other hand when the knocking does not occur, the retard continuing time count value COUNT1 and the ignition timing retard quantity ADVRTD are set as 0 (S95→S94→S90).

Accordingly, the retard correction of the ignition timing can be made only when necessary and the torque reduction due to the retard correction of the ignition timing is minimized. Even when the knocking can not be sufficiently avoided by the retard correction of the ignition timing being made after detecting the knocking occurrence, since, other than the initial control, the retard correction of the ignition timing can be made as soon as the judgement flag FRTD is confirmed, the knocking is properly mimimized.

Figure 10:
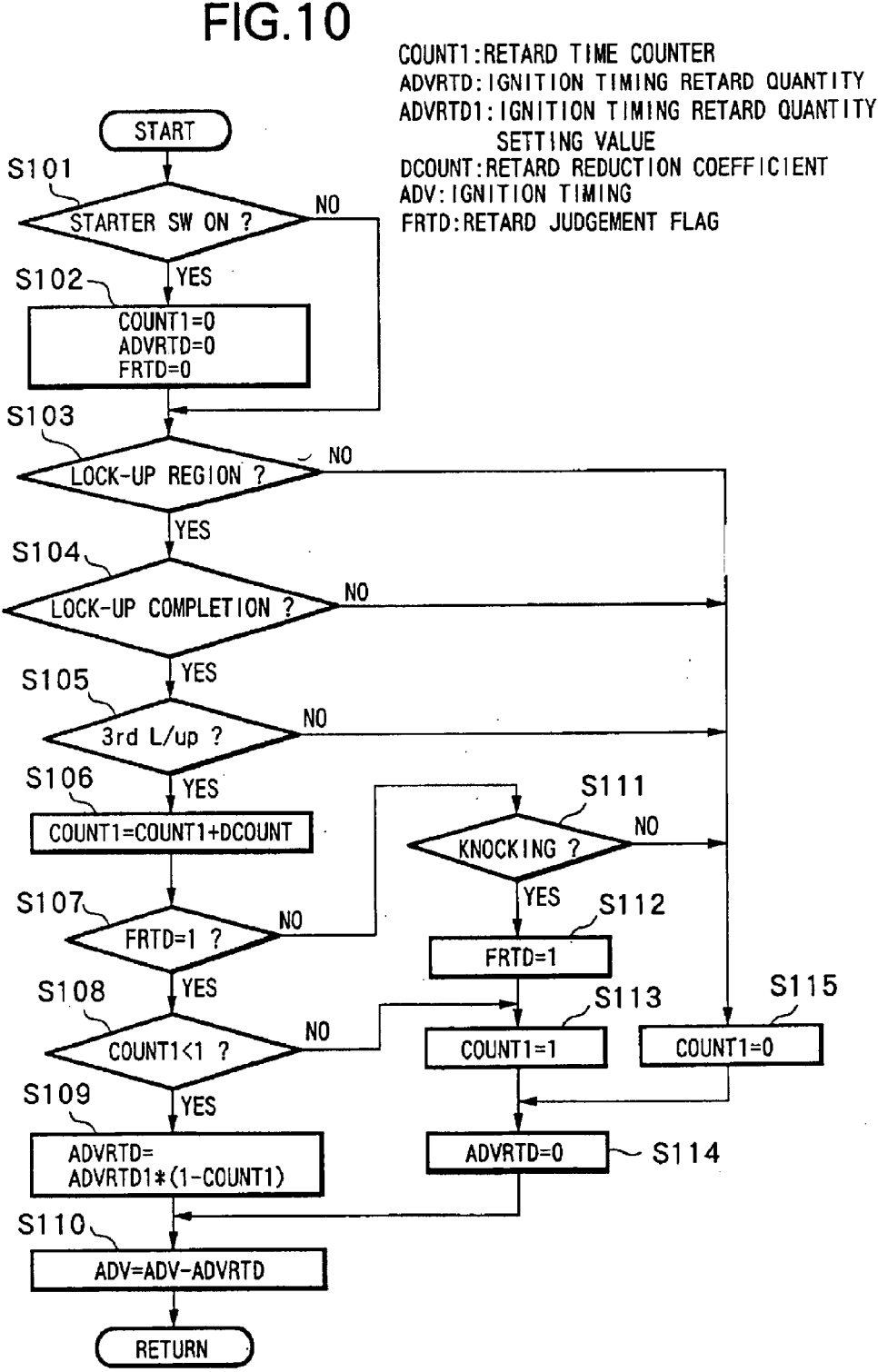
FIG. 10 is a flowchart showing a sixth embodiment thereof.

FIG. 10 is a flowchart showing a sixth embodiment and differs from the fifth embodiment in reducing a retard correction quantity of the ignition timing corresponding to an elapse time from the lock-up completion. In detail, as shown in FIG. 10, S106, S108, and S109 are different from the fifth embodiment (FIG. 9) and the same as S26, S27, and S28 in the second embodiment (FIG. 6). Accordingly, the effect of the fifth embodiment is maintained and at the same time a difference in the torque levels at a completion of the retard correction control of the ignition timing can be restricted.

Figure 11:
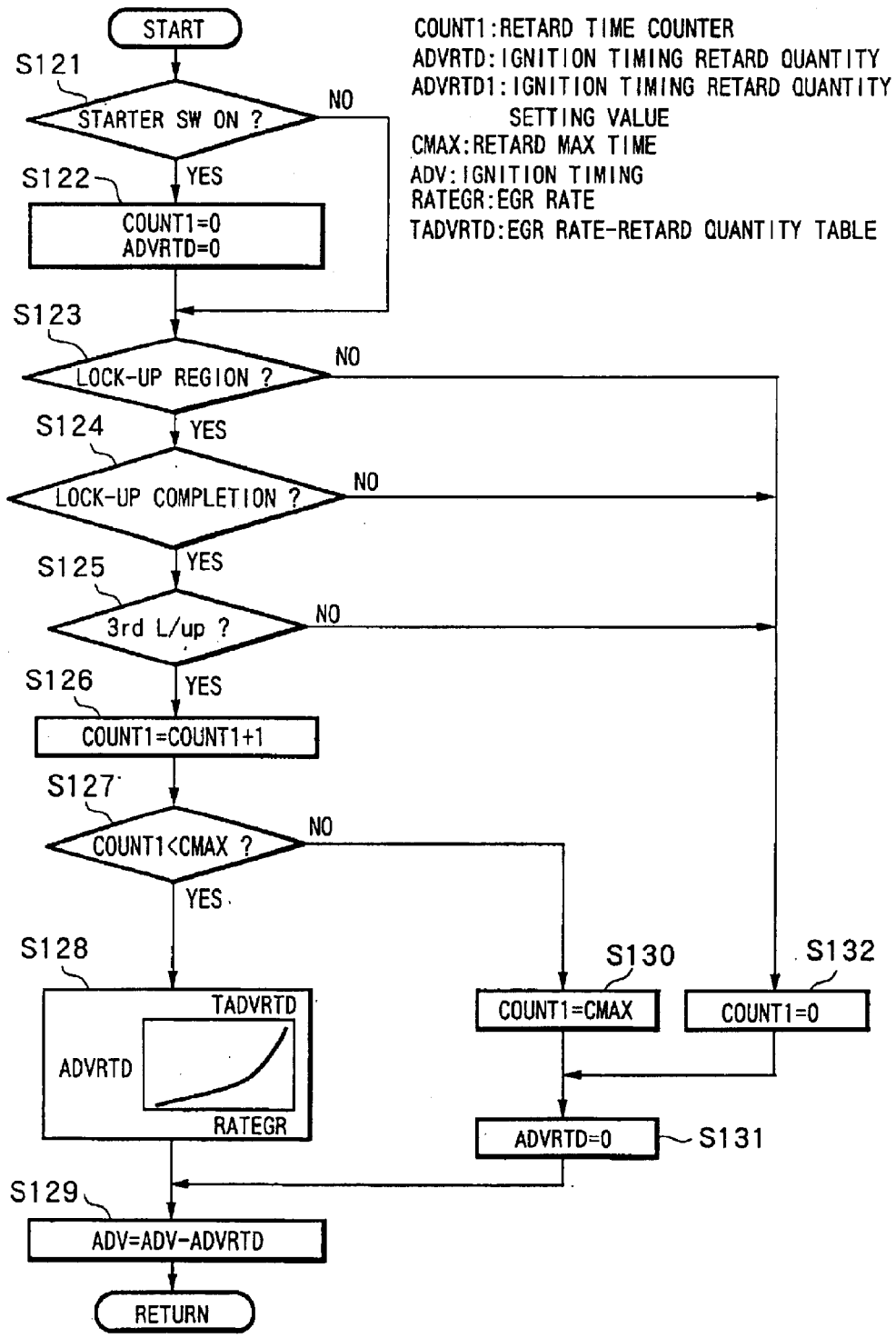
FIG. 11 is a flowchart showing a seventh embodiment thereof.

FIG. 11 is a flowchart showing a seventh embodiment which differs from the first embodiment in table-retrieving the ignition timing retard quantity ADVRTD immediately after the lock-up based upon an EGR rate RATEGR. In an engine with an EGR control, since an actual remaining gas rate does not change immediately, the actual remaining gas rate transitionally differs from a target value (target EGR rate), and therefore, the knocking may occur due to the rapid combustion fluctuation.

Therefore, a table TADVRTD is made by determining a relationship between the actual EGR rate (remaining gas rate) at the third lock-up and the optimal ignition timing retard quantity by experiments in advance and an ignition timing retard correction ADVRTD is set by retrieving this table. Thereby the ignition timing corresponds to the actual EGR rate (remaining gas rate) and the knocking is effectively avoided.

In FIG. 11, S121~S127 are the same as S1~S7 in the first embodiment (FIG. 5). At S128, the ignition timing retard quantity ADVRTD is set by retrieving the table based upon the EGR rate RATEGR. At S129, the retard correction of the ignition timing is made based upon the ignition timing retard quantity ADVRTD set at S128. Accordingly, even if the remaining gas immediately after the lock-up is temporarily lower than the target, the optimal ignition timing corresponding to the actual EGR rate can be set. Therefore, the knocking due to the combustion instability can be properly avoided.

In this embodiment is explained an engine which is equipped with an EGR apparatus comprises EGR passage 15 and EGR valve 16 and an external EGR system wherein part of the exhaust gases is recirculated into an intake system through EGR passage 15, but this invention may be applied to an engine which is equipped with an internal EGR system wherein a variable operating valve mechanism for varying at least one of valve operating characteristics of an intake valve and an exhaust valve is provided and an EGR is made by controlling a valve overlap quantity through the variable operating valve mechanism. In this case the variable operating valve mechanism comprises the EGR apparatus.

Figure 12:
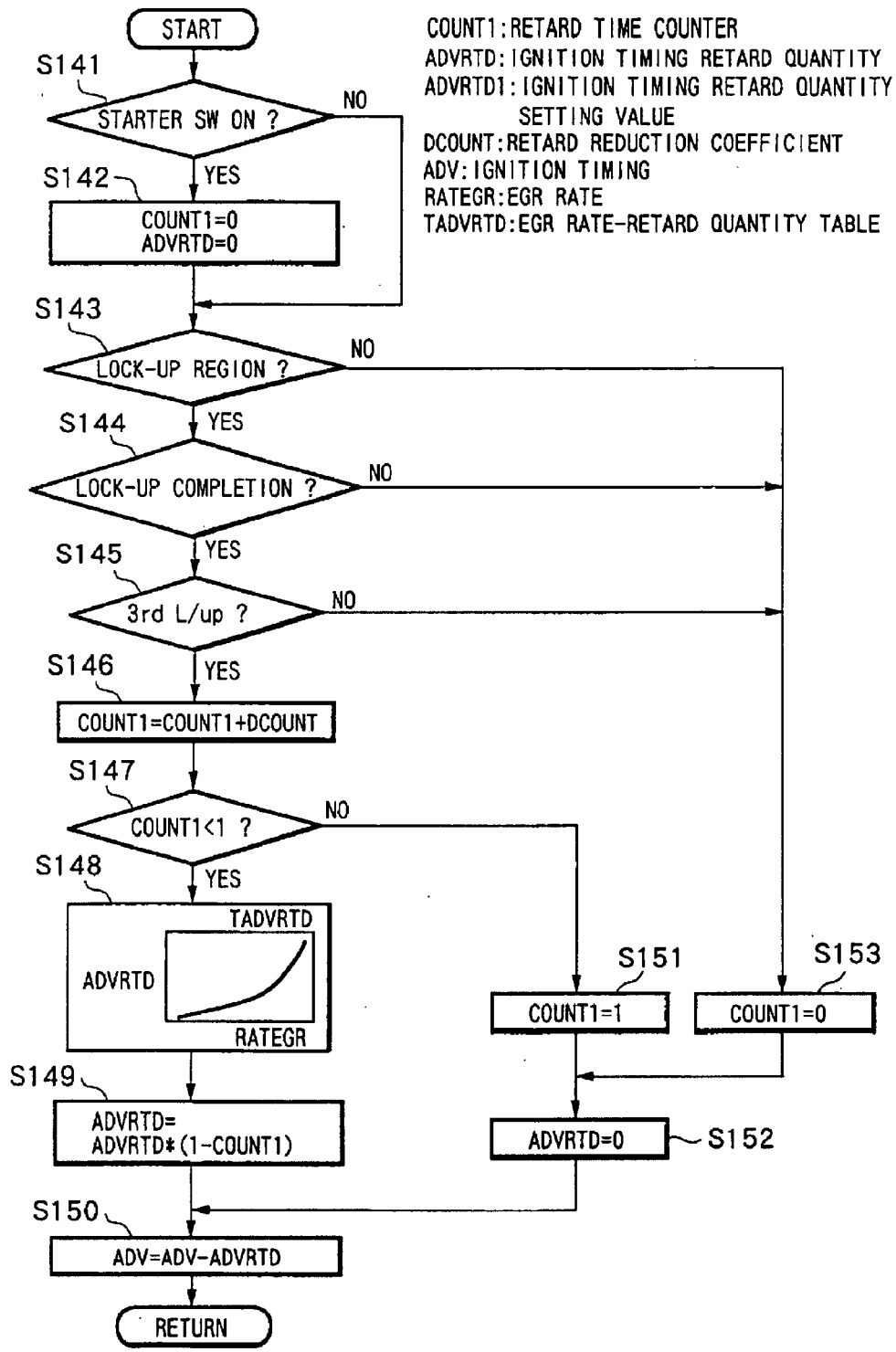
FIG. 12 is a flowchart showing an eighth embodiment thereof.

FIG. 12 is a flowchart showing an eighth embodiment and differs from the seventh embodiment in reducing a retard correction quantity of the ignition timing corresponding to an elapse time from the lock-up completion. In detail, as shown in FIG. 12, S146, S147, and S149 are different from the seventh embodiment (FIG. 11) and the same as S26, S27, and S28 in the second embodiment (FIG. 6). Accordingly, the effect of the seventh embodiment is maintained and at the same time a difference in the torque levels at a completion of the retard correction control of the ignition timing can be restricted.

Figure 13:
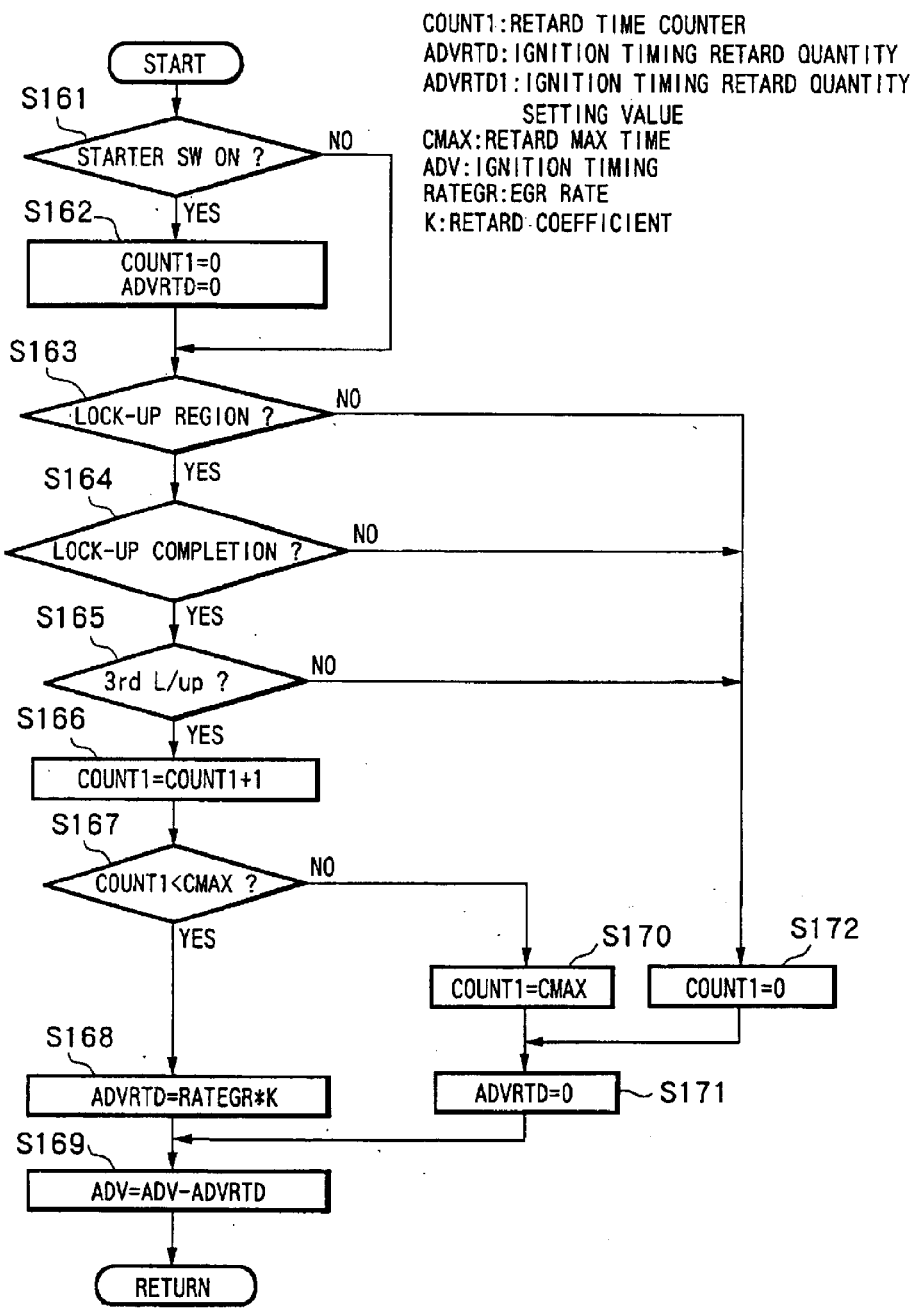
FIG. 13 is a flowchart showing a ninth embodiment thereof.

FIG. 13 is a flowchart showing a ninth embodiment and differs from the seventh embodiment in that the ignition timing retard quantity ADVRTD is set by multiplying the EGR rate at the third lock-up and an ignition timing retard coefficient K without a table retrieval. The ignition timing retard coefficient K is determined by experiments in advance. In detail, as shown in FIG. 13, at S168, this embodiment differs from the seventh embodiment (S128 in FIG. 11) in that the ignition timing retard quantity ADVRTD is calculated as the EGR rate RATEGR×the ignition timing retard coefficient K, and since the other steps are the same as the seventh embodiment, the explanation is omitted. Accordingly, due to elimination of the table TADVRTD, simplification of the program and the system is possible while maintaining the effect of the seventh embodiment.

Figure 14:
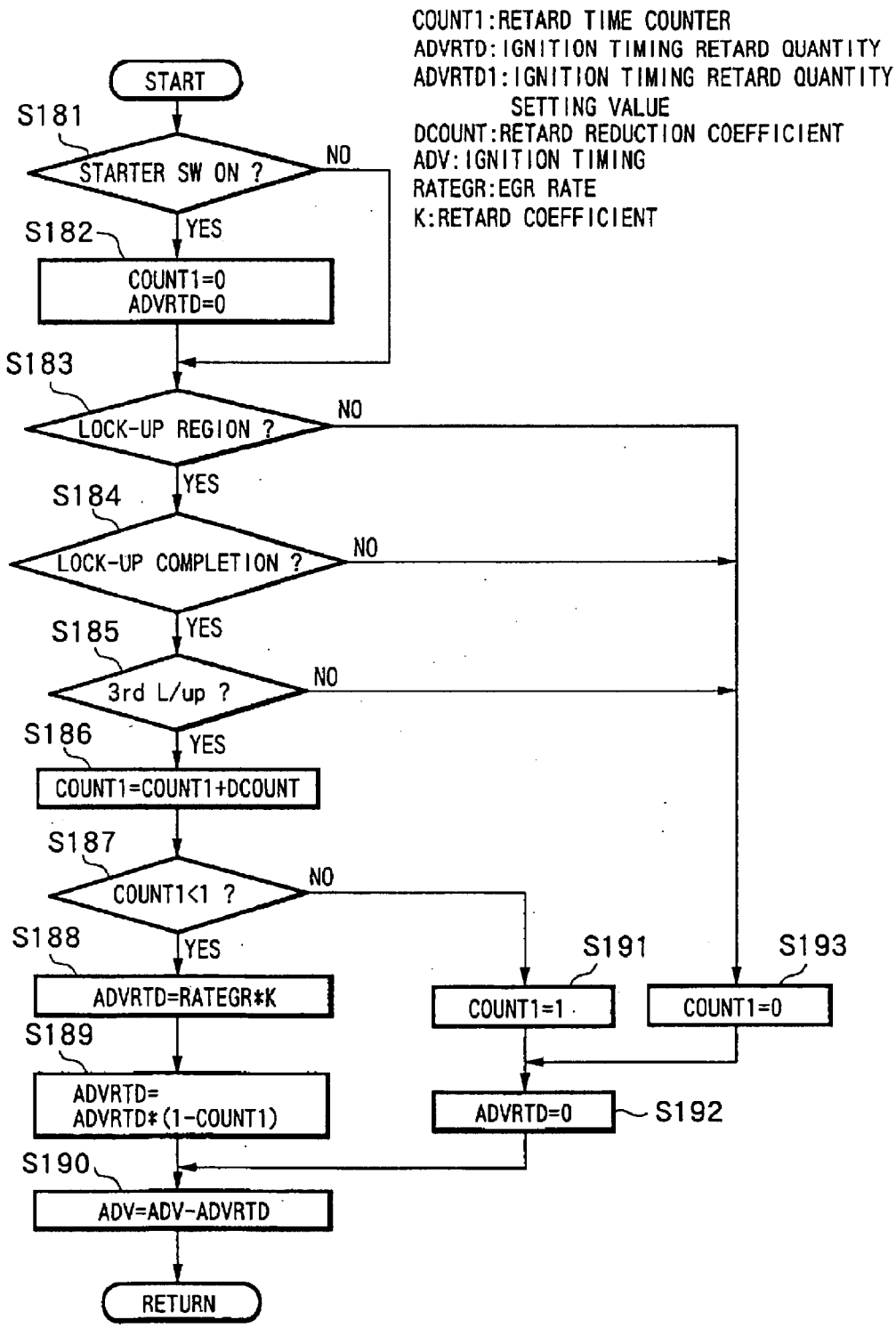
FIG. 14 is a flowchart showing a tenth embodiment thereof.

FIG. 14 is a flowchart showing a tenth embodiment and differs from the ninth embodiment in reducing a retard correction quantity of the ignition timing corresponding to an elapse time from the lock-up completion. In detail, as shown in FIG. 14, S186, S187, and S189 are different from the ninth embodiment (FIG. 13) and the same as S26, S27, and S28 in the second embodiment (FIG. 6). Accordingly, the effect of the ninth embodiment is maintained and at the same time a difference in the torque levels at a completion of the retard correction control of the ignition timing can be restricted.

Figure 15:
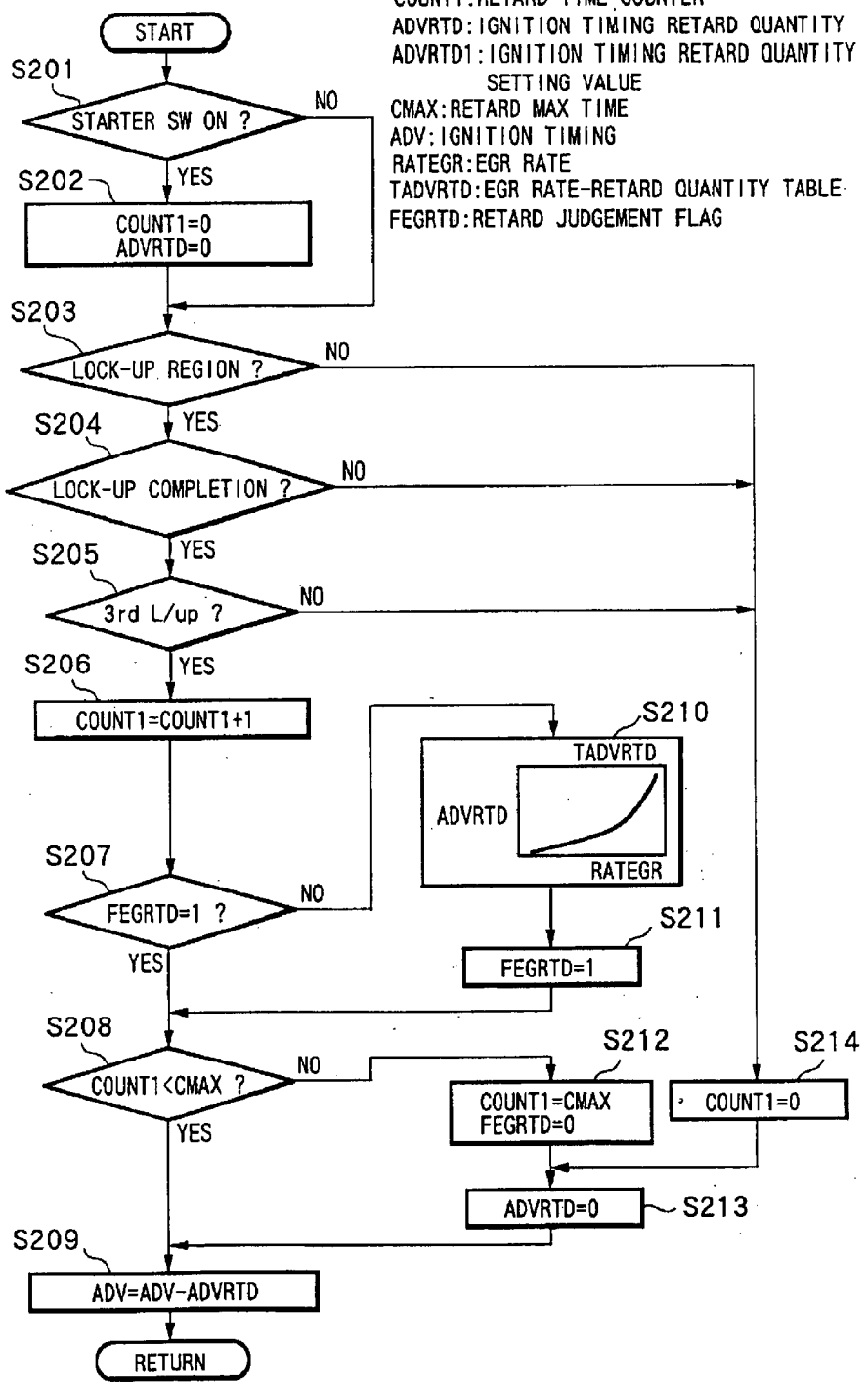
FIG. 15 is a flowchart showing an eleventh embodiment thereof.

FIG. 15 is a flowchart showing an eleventh embodiment and differs from the seventh embodiment in that the ignition timing retard quantity ADVRTD by a table retrieval based upon the EGR rate at the third lock-up is set one time per one trip (only first time). Namely, this embodiment differs in that the set ignition timing retard quantity ADVRTD is stored and the stored ignition timing retard quantity ADVRTD is set only by confirming the retard quantity setting flag FEGRTD without a table retrieval following the initial loop. In FIG. 15, S201~S206 are the same as the S1~S8 in the first embodiment (FIG. 5).

At S207, it is judged whether or not the retard quantity setting flag FEGRTD is 1 (namely, whether the retard quantity setting flag FEGRTD is set). This retard quantity setting flag FEGRTD shows whether or not the ignition timing retard quantity ADVRTD is already set by a table retrieval based upon the EGR rate RATEGR and will be set at S211 described later. When the retard setting flag FEGRTD is set (FEGRTD=1), the process goes to S208.

On the other hand when the retard setting flag is not set (FEGRTD=0), the process goes to S210 wherein the ignition timing retard quantity ADVRTD is set by a table retrieval based upon the EGR rate RATEGR and is stored. After, at S211 the retard setting flag is set, the process goes to S208.

At S208, it is judged whether or not the retard correction continuing time count value COUNT1 is smaller than the retard maximum time count value CMAX. When the retard correction continuing time count value COUNT1 is smaller than the retard maximum time count value CMAX, the process goes to S209 wherein a retard correction of the ignition timing is made by subtracting the storedh ignition timing retard quantity ADVRTD from the set ignition timing ADV. On the other hand, when the retard correction continuing time count value COUNT1 is larger than the retard maximum time count value CMAX, the retard correction continuing time count value COUNT1 is set as CMAX, the retard quantity setting flag FEGRTD is set as 0, and the retard quantity ADVRTD of the ignition timing is set as 0 (S212→S213→S209).

Accordingly, during the same trip wherein conditions related to the knocking occurrence are assumed not to significantly change, since setting the ignition timing retard quantity ADVRTD by a table retrieval is done only one initial time, high speed control of the ignition timing retard correction is made.

Figure 16:
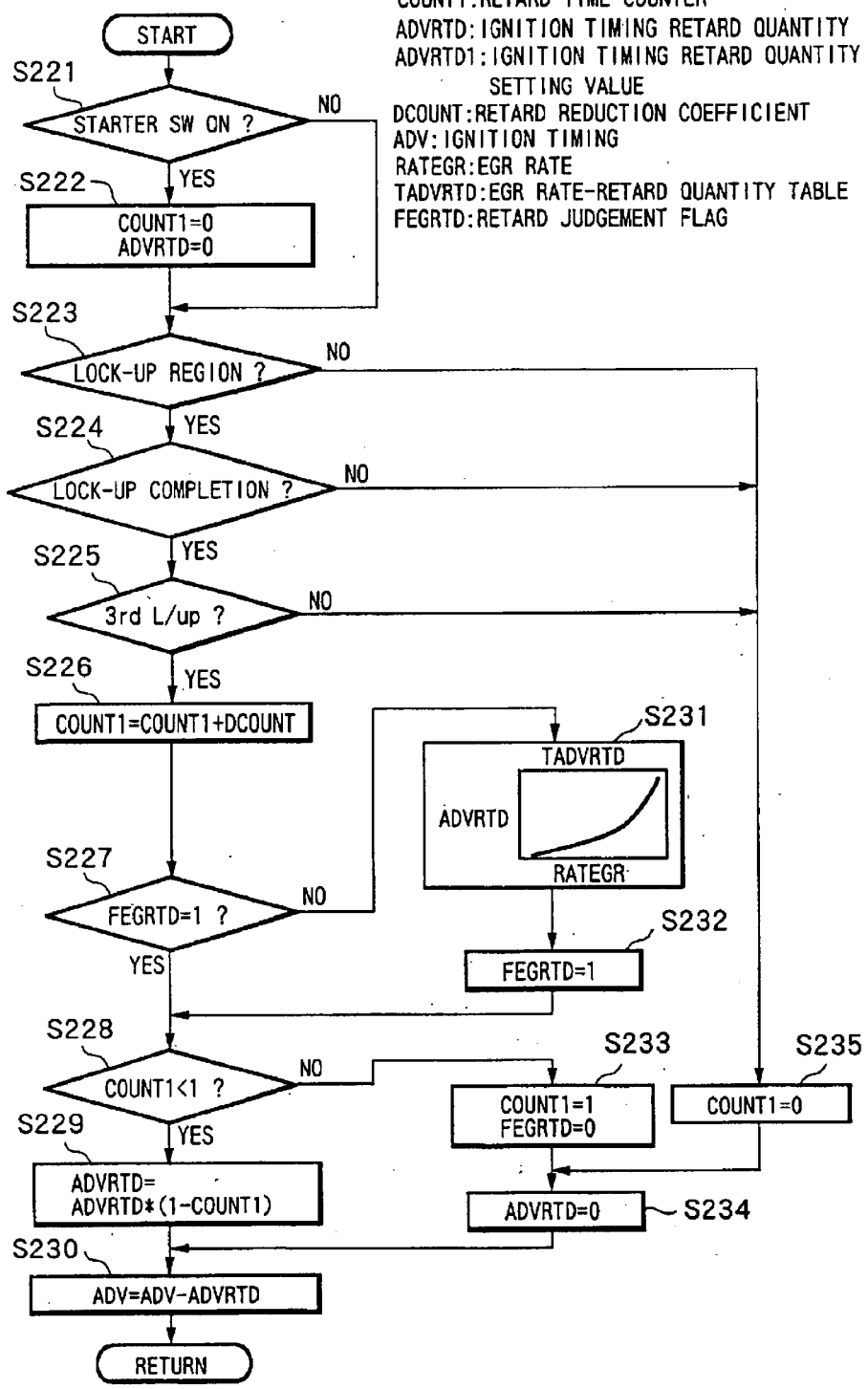
FIG. 16 is a flowchart showing a twelfth embodiment thereof.

FIG. 16 is a flowchart showing a twelfth embodiment and differs from the eleventh embodiment in reducing a retard correction quantity of the ignition timing corresponding to an elapse time from the lock-up completion. In detail, as shown in FIG. 16, S226, S228, and S229 are different from the eleventh embodiment (FIG. 15) and the same as S26, S27, and S28 in the second embodiment (FIG. 6). Accordingly, the effect of the eleventh embodiment is maintained and at the same time a difference in the torque levels at a completion of the retard correction control of the ignition timing can be restricted.

Figure 17:
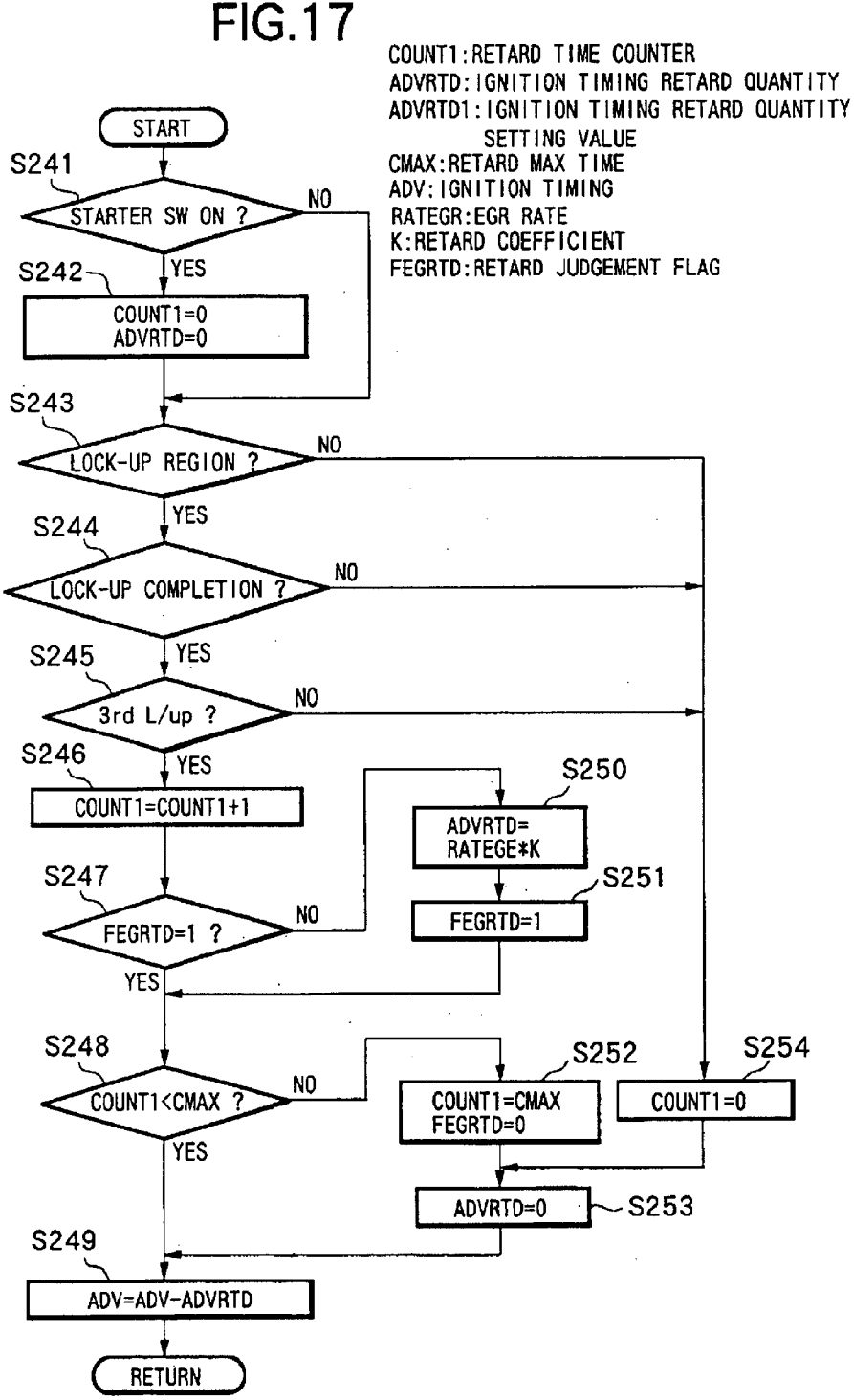
FIG. 17 is a flowchart showing a thirteenth embodiment thereof.

FIG. 17 is a flowchart showing a thirteenth embodiment and differs from the eleventh embodiment in that the ignition timing retard quantity ADVRTD is set by multiplying the EGR rate at the third lock-up and an ignition timing retard coefficient K. In detail, as shown in FIG. 17, at S250, this embodiment differs from the eleventh embodiment (FIG. 15) in that the ignition timing retard quantity ADVRTD is calculated as the EGR rate RATEGR×the ignition timing retard coefficient K, and since the other steps are the same as the eleventh embodiment, the explanation is omitted. Accordingly, due to elimination of the table TADVRTD, simplification of the program and the system is possible while maintaining the effect of the eleventh embodiment.

FIG. 18 is a flowchart showing a fourteenth embodiment and differs from the thirteenth embodiment in reducing a retard correction quantity of the ignition timing corresponding to an elapse time from the lock-up completion. In detail, as shown in FIG. 18, S266, S268, and S269 are different from the thirteenth embodiment (FIG. 17) and the same as S26, S27, and S28 in the second embodiment (FIG. 6). Accordingly, the effect of the thirteenth embodiment is maintained and at the same time a difference in the torque levels at a completion of the retard correction control of the ignition timing can be restricted.

FIG. 19 is a flowchart showing a fifteenth embodiment which differs from the eleventh embodiment in table retrieving the ignition timing retard quantity ADVRTD2 immediately after the lock-up based upon an atmosphere temperature TA. In detail, as shown in FIG. 19, only tables used at S290 are different from tables used at S210 of the eleventh embodiment and the other steps are the same as in the eleventh embodiment. Namely, in the embodiment, setting the ignition timing retard quantity ADVRTD is done one time per one trip and at S290, the ignition timing retard quantity ADVRTD is set by a table retrieval based upon the atmosphere temperature TA detected by temperature sensor 37. The table ADVRTD used herein is made in advance by determining a relationship between the atmosphere temperature TA at the third lock-up and the optimal ignition timing retard quantity by experiments. Since, thereby, the ignition timing retard quantity can be set based upon the atmosphere temperature related to the knocking occurrence, accuracy of ignition timing retard control immediately after the lock-up can be improved and the knocking is properly avoided. Due to one table retrieval per one trip, high speed control of the ignition timing retard correction can be done.

FIG. 20 is a flowchart showing a sixteenth embodiment and differs from the fifteenth embodiment in reducing a retard correction quantity of the ignition timing corresponding to an elapse time from the lock-up completion. In detail, as shown in FIG. 20, S306, S308, and S309 are different from the fifteenth embodiment (FIG. 19) and the same as S26, S27, and S28 in the second embodiment (FIG. 6). Accordingly, the effect of the fifteenth embodiment is maintained and at the same time a difference in the torque levels at a completion of the retard correction control of the ignition timing can be restricted.

Figure 21A:
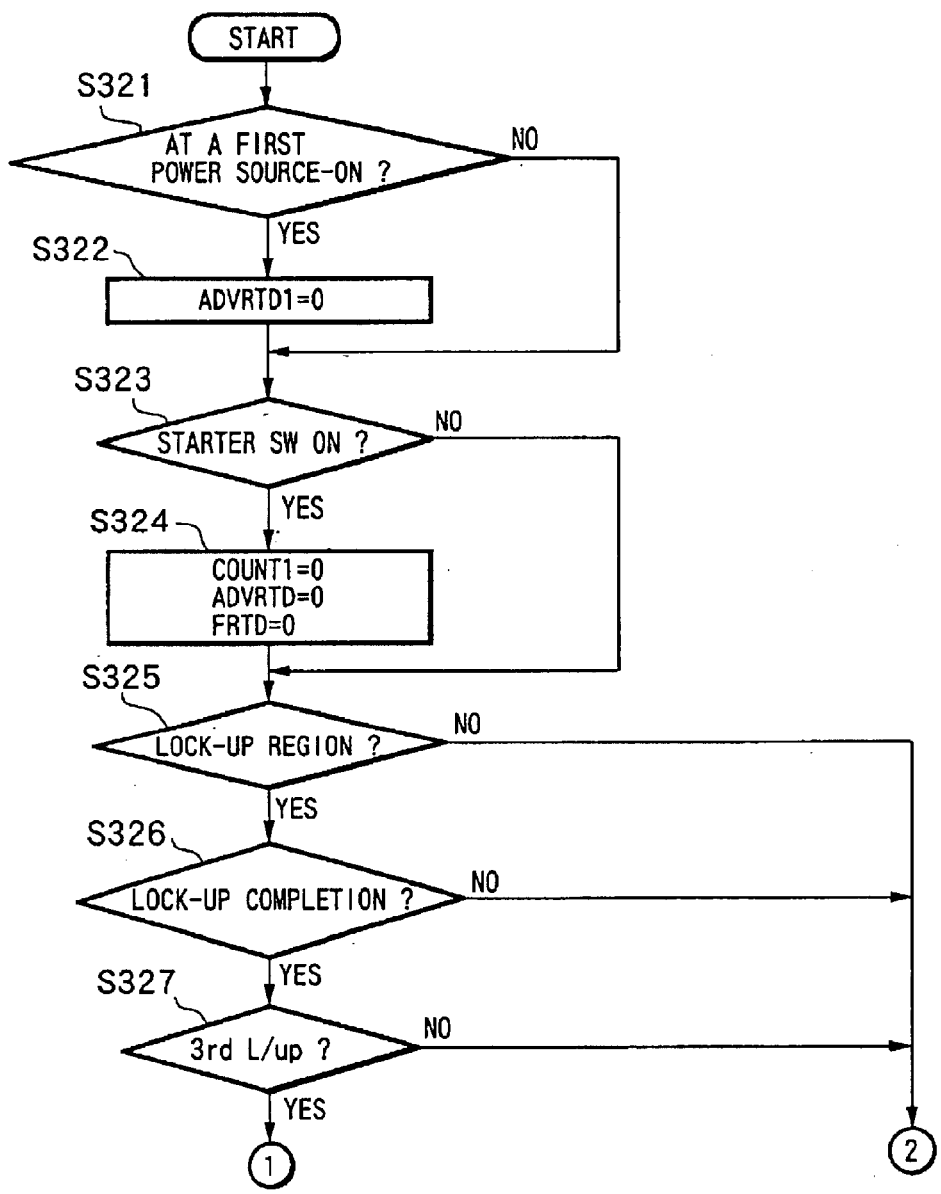
FIG. 21A and FIG. 21B are a flowchart showing a seventeenth embodiment thereof.
Figure 21B:
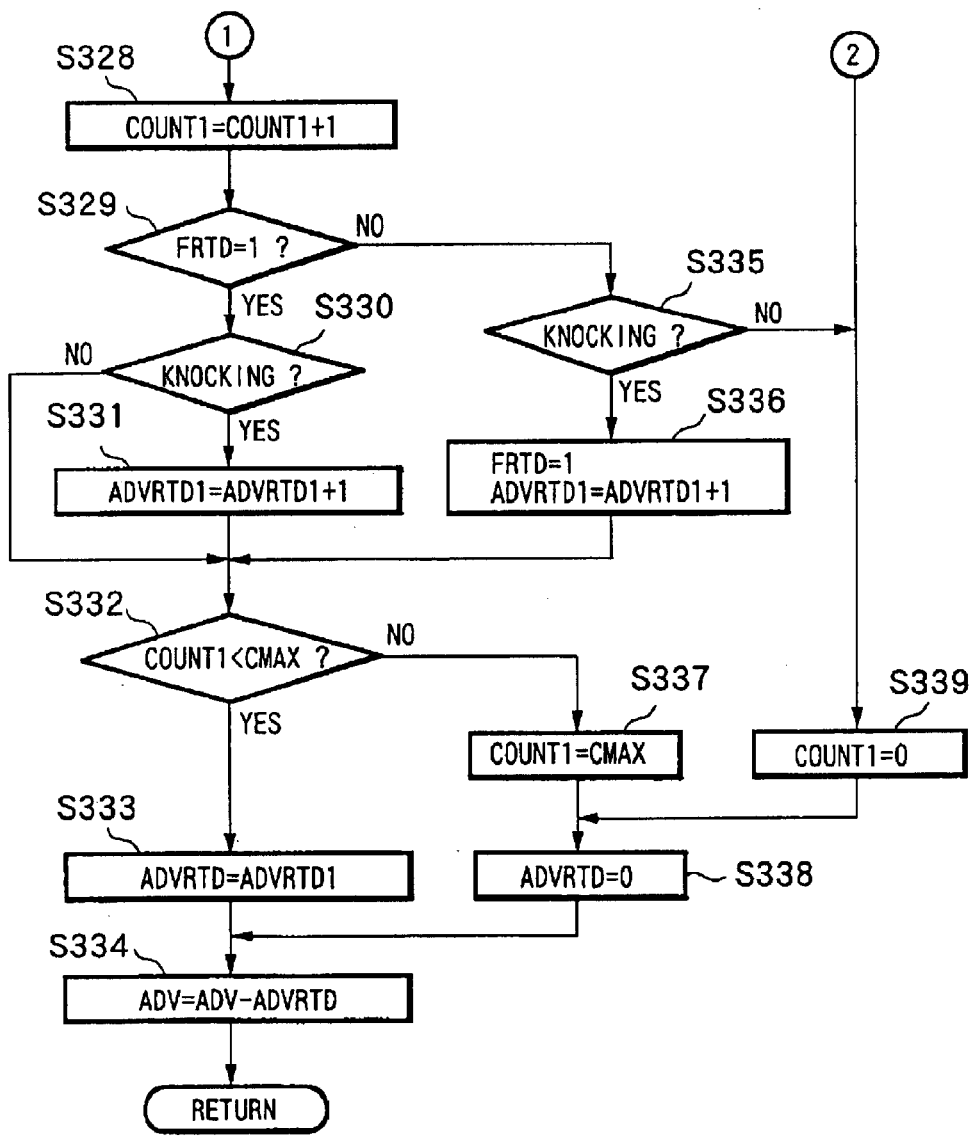

FIG. 21A and FIG. 21B are a flowchart showing a seventeenth embodiment wherein the ignition timing retard quantity is added at a knocking judgement to the third embodiment. In FIGS. 21A and 21B, at S321 and at S322, it is judged whether or not it is the first time to switch on a power source and when it is the first time, an initial setting for a setting value ADVRTD1 of the ignition timing retard quantity is made (ADVRTD1=0).

At S323 and S324, it is judged whether or not a starter switch is on and when the starter switch is on, initial settings for the retard continuing time count value COUNT1, the ignition timing retard quantity ADVRTD, and the judgement flag FRTD are made. S325~S328 are the same as S3~S6 in the first embodiment (FIG. 5).

At S329, it is judged whether or not the judgement flag FRTD is set (FRTD=1) and when the judgement flag is set, the process goes to S330 wherein it is judged whether or not a knocking occurs. The knocking occurrence judgement is the same as S48 in the third embodiment (FIG. 7). At S330, when the knocking occurs, the process goes to S331 wherein after the setting value ADVRTD1 of the ignition timing retard quantity is incremented, the process goes to S332. When the knocking does not occur, the process goes to S332 since the ignition timing does not need to be retarded any further.

Back to S329, if the judgement flag FRTD is not set (namely, FRTD=0), the process goes to S335 wherein it is judged whether or not a knocking occurs. When the knocking occurs, the process goes to S338 wherein after the judgement flag is set (FRTD=1) and the setting value of the ignition timing retard quantity ADVRTD1 is incremented, the process goes to S332. When the knocking does not occur, the retard continuing time count value COUNT1 is set as 0 and the ignition timing retard quantity ADVRTD is set as 0 (S339→S338→S334).

At S332, it is judged whether or not the retard correction continuing time count value COUNT1 is smaller than the retard maximum time count value CMAX. When the retard correction continuing time count value COUNT1 is smaller than the retard maximum time count value CMAX, the process goes to S333. On the other hand, when the retard correction continuing time count value COUNT1 is larger than the retard maximum time count value CMAX, the retard correction continuing time count value COUNT1 is set as 1 and the retard quantity ADVRTD of the ignition timing is set as 0 (S337→S338→S334). At S333, the ignition timing retard quantity ADVRTD is set at a value ADVRTD1 of the ignition timing set in advance.

At S334, a retard correction of the ignition timing is made by subtracting the ignition timing retard quantity ADVRTD from the set ignition timing ADV.

Accordingly, when the knocking occurs, the retard correction of the ignition timing is made and since when the knocking continues to occur afterwards, the retard correction quantity of the ignition timing s made to increase, the knocking is properly avoided.

Figure 22A:
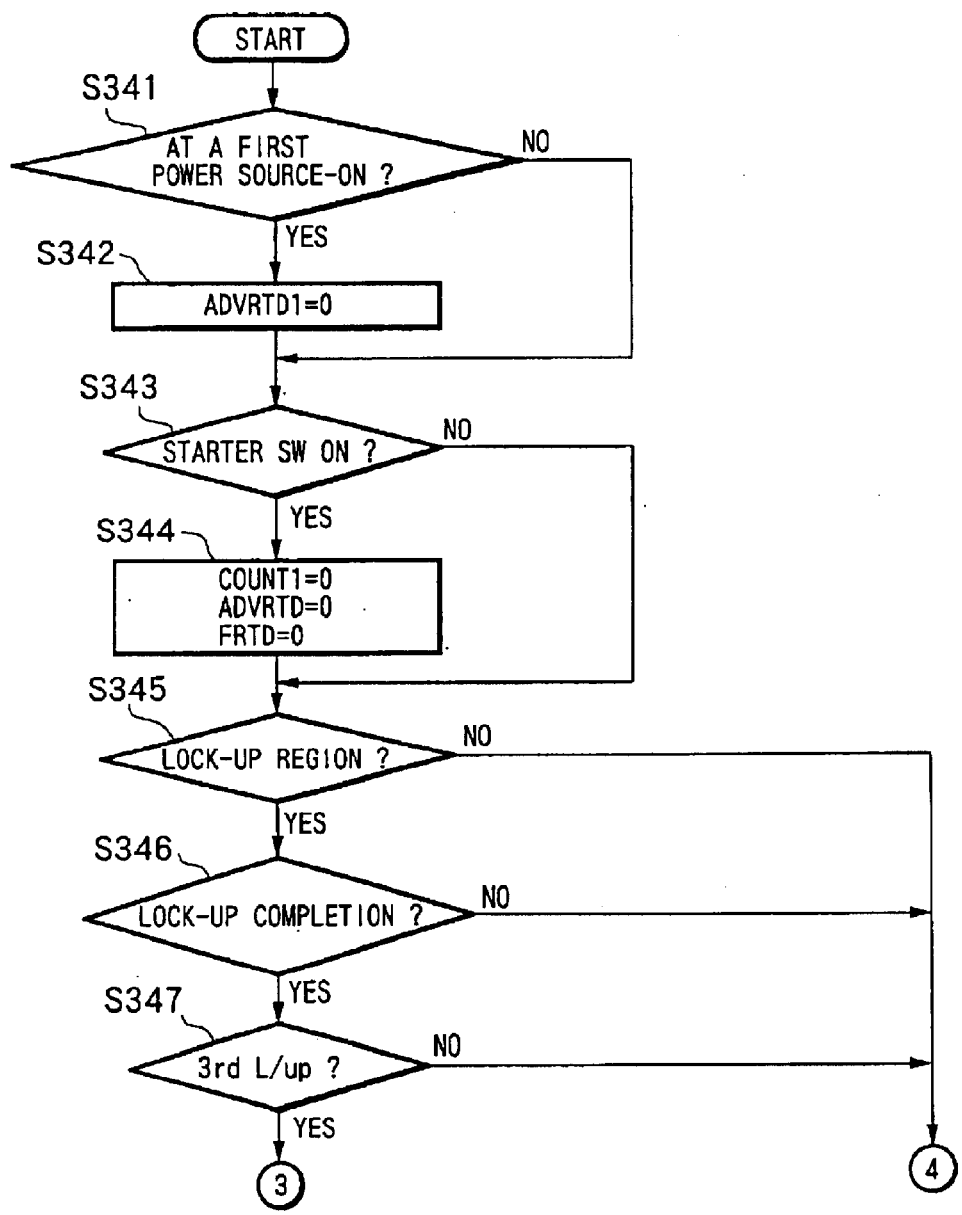
FIG. 22A and FIG. 22B are a flowchart showing an eighteenth embodiment thereof.
Figure 22B:
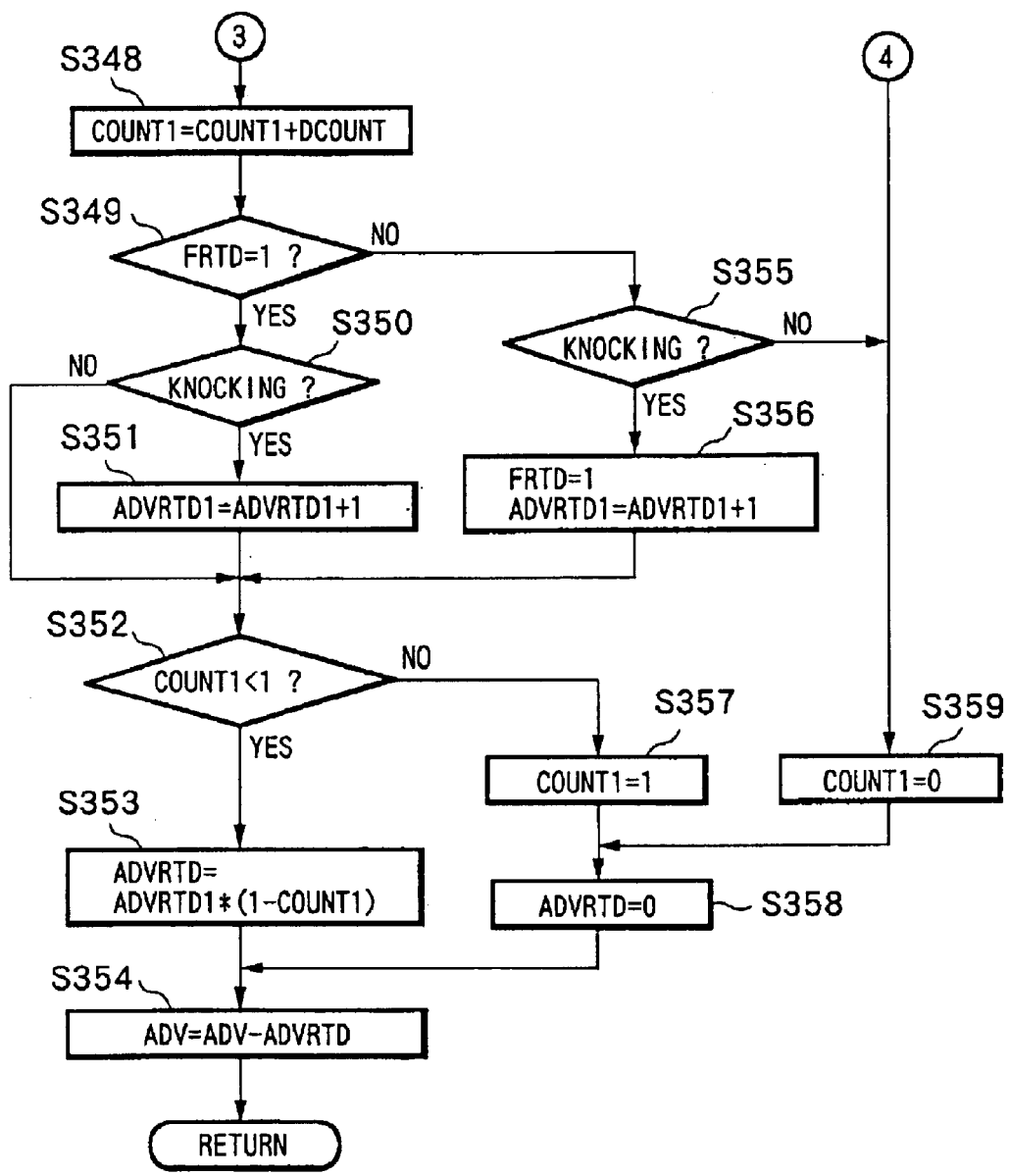

FIG. 22A and FIG. 22B are a flowchart showing an eighteenth embodiment and differs from the seventeenth embodiment in reducing a retard correction quantity of the ignition timing corresponding to an elapse time from the lock-up completion. In detail, as shown in FIGS. 22A and 22B, S348, S352, and S353 are different from the seventeenth embodiment (FIGS. 21A and 21B) and the same as S26, S27, and S28 in the second embodiment (FIG. 6). Accordingly, the effect of the seventeenth embodiment is maintained and at the same time a difference in the torque levels at a completion of the retard correction control of the ignition timing can be restricted.

Figure 23A:
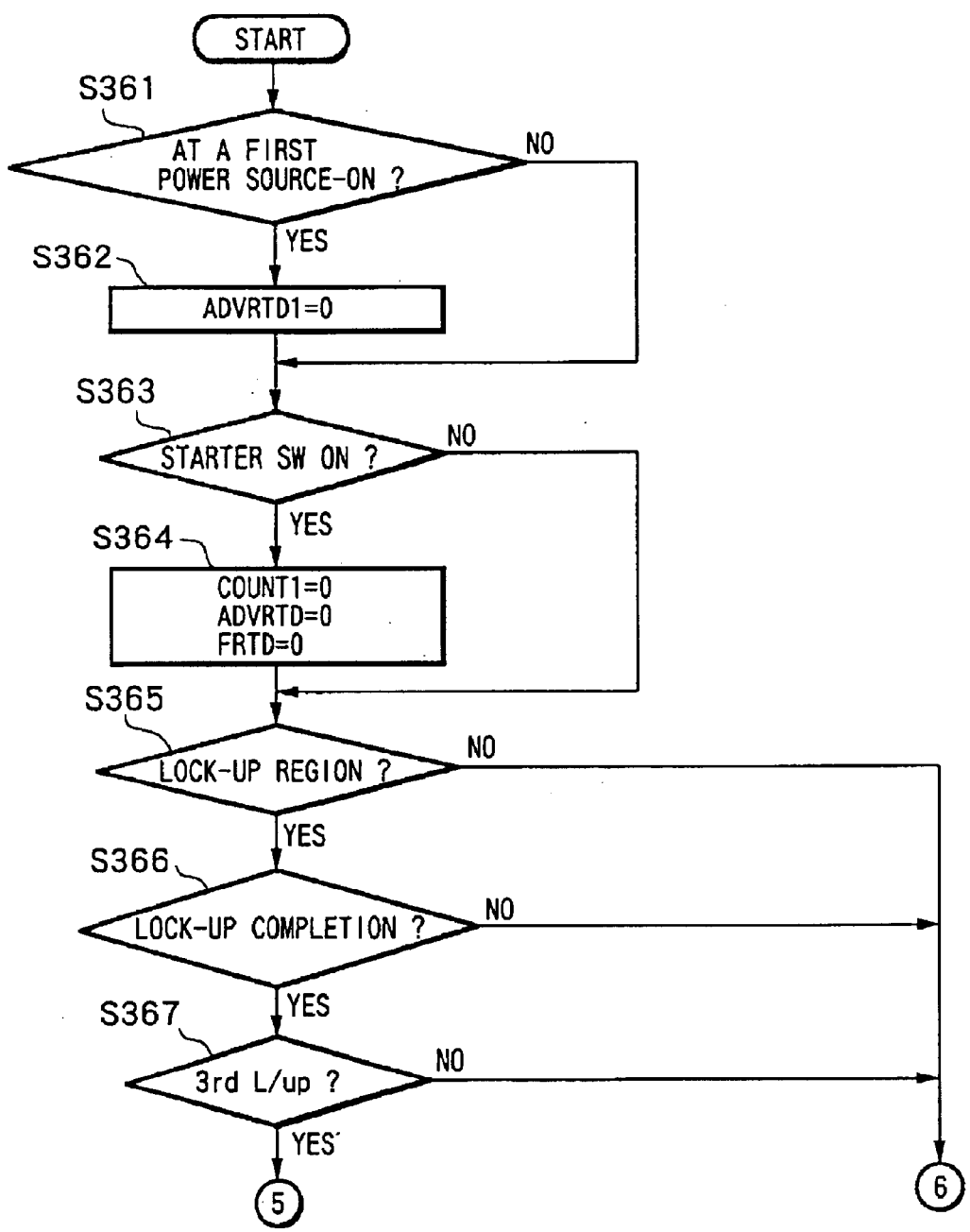
FIG. 23A and FIG. 23B are a flowchart showing a nineteenth embodiment thereof.
Figure 23B:
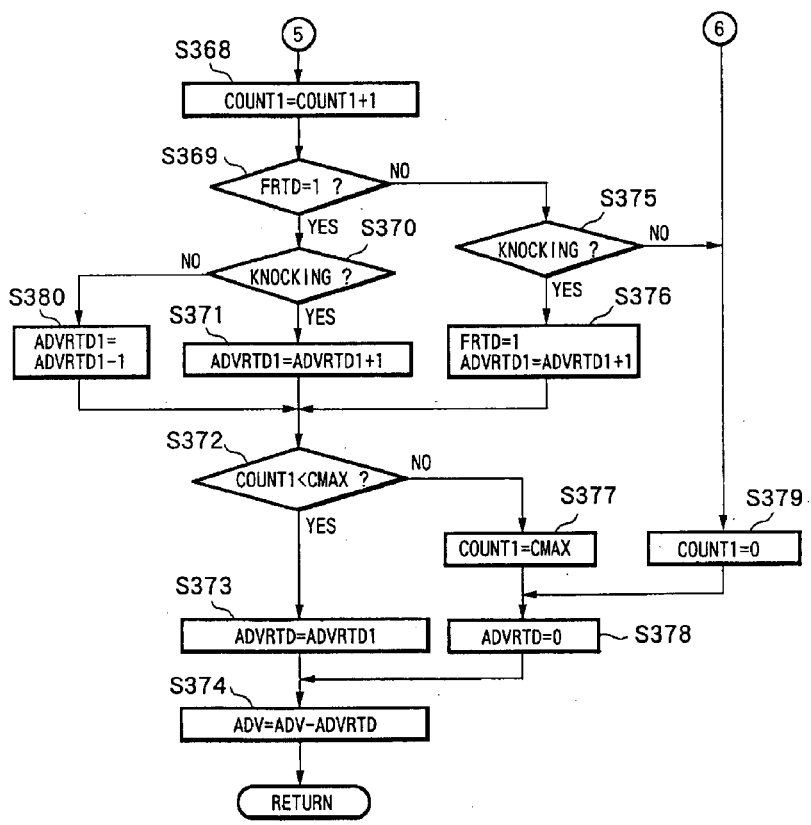

FIG. 23A and FIG. 23B are a flowchart showing a nineteenth embodiment wherein when it is judged that the knocking does not occur, an ignition timing retard quantity is subtracted in the seventeenth embodiment (namely, the ignition timing retarded is controlled back to an advance direction). In detail, as shown in FIGS. 23A and 23B, this embodiment has an additional step S380 as compared to the seventeenth embodiment (FIGS. 21A and 21B) and the other steps thereof are the same as in the seventeenth embodiment. In FIGS. 23A and 23B, when the knocking does not occur at S370, the process goes to S380 wherein after the setting value ADVRTD1 of the ignition timing retard quantity is subtracted, the process goes to S372 (corresponding to S332 in the seventeenth embodiment).

Accordingly, when the knocking occurs, it is properly avoided by adding me ignition timing retard quantity and when the knocking does not occur, due to reduction of the ignition timing retard quantity, the torque goes up corresponding to that reduction quantity (the torque decrease can be suppressed).

Figure 24A:
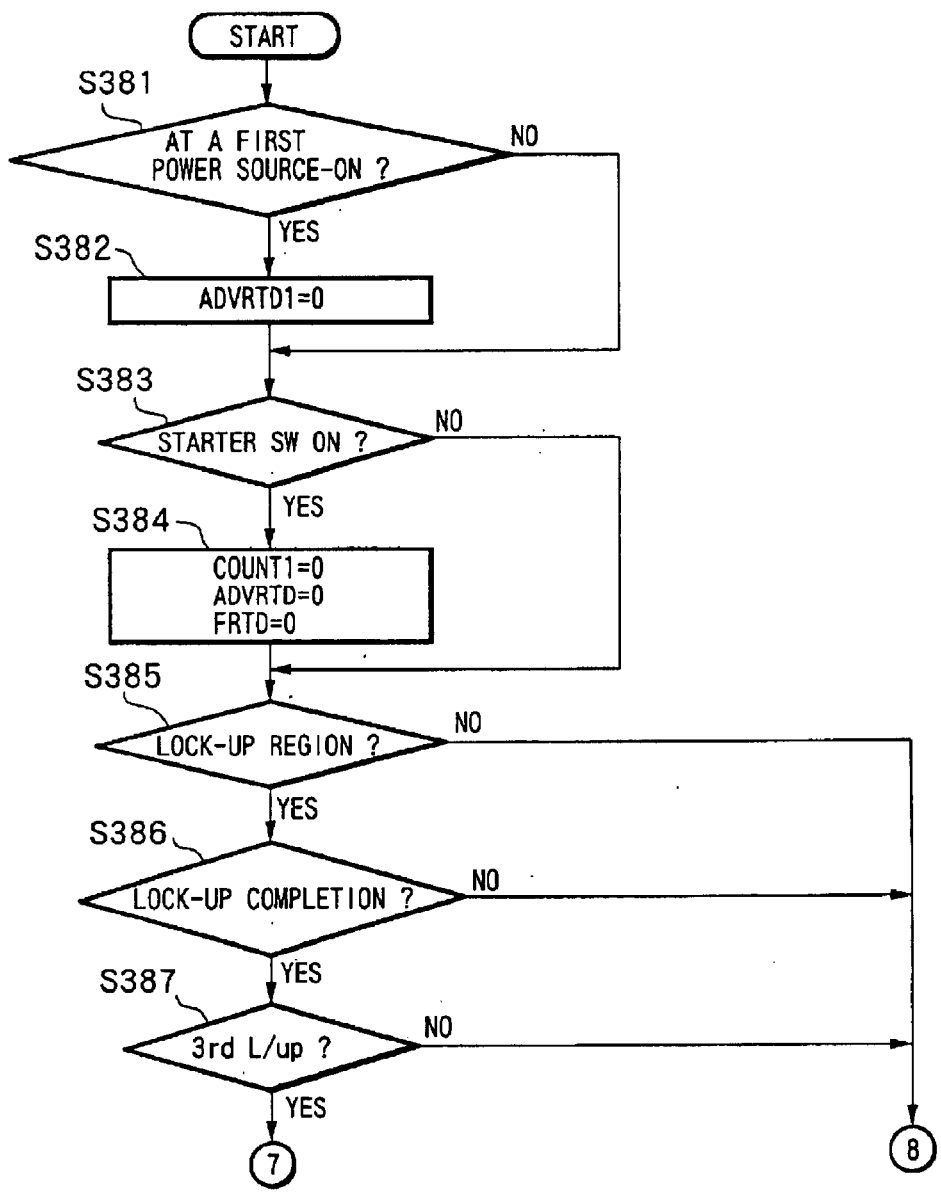
FIG. 24A and FIG. 24B are a flowchart showing a twentieth embodiment thereof.
Figure 24B:
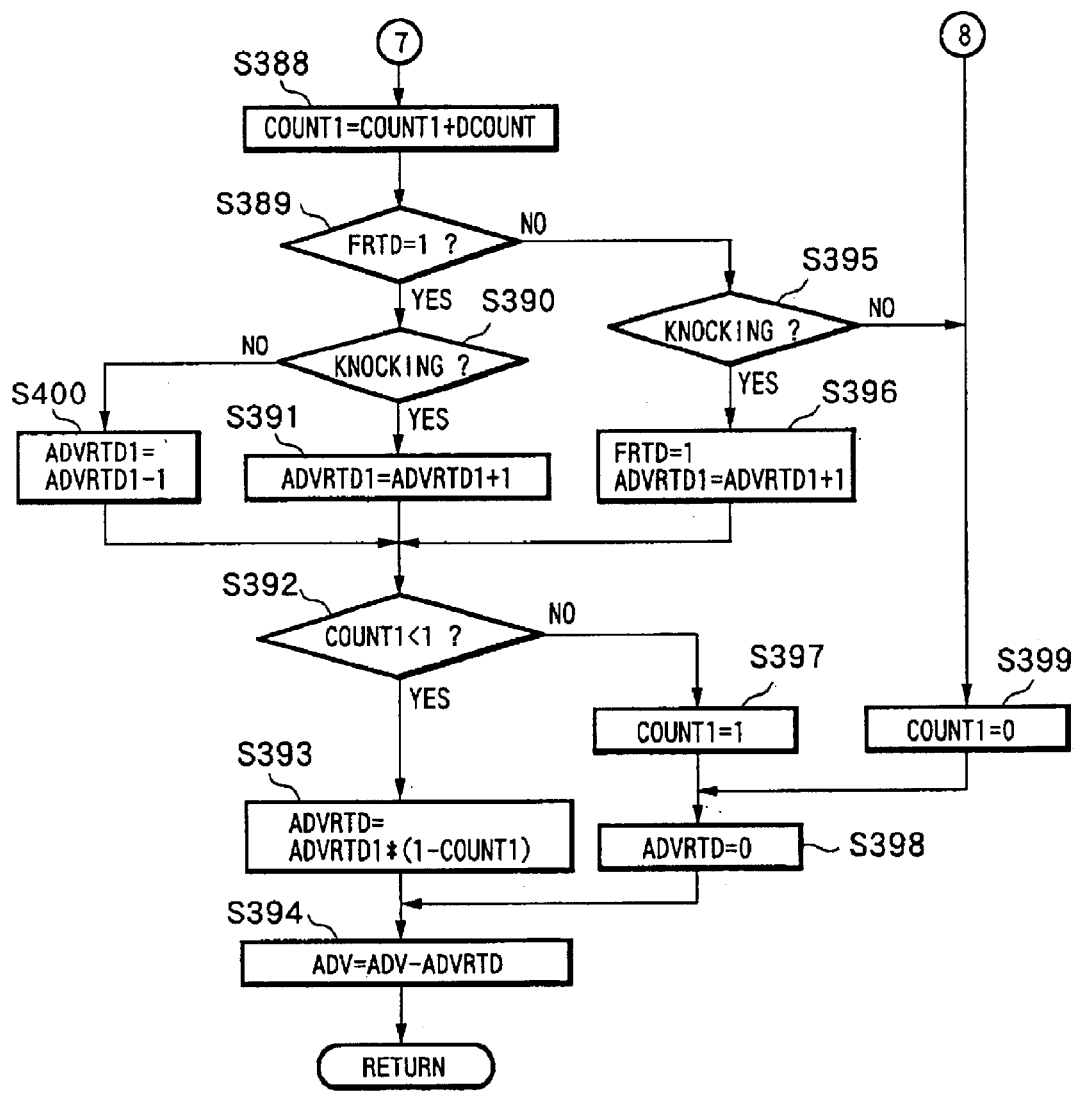

FIG. 24A and FIG. 24B are a flowchart showing a twentieth embodiment and differs from the nineteenth embodiment in reducing a retard correction quantity of the ignition timing corresponding to an elapse time from the lock-up completion. In detail, as shown in FIGS. 24A and 24B, S388, S392, and S393 are different from the nineteenth embodiment (FIGS. 23A and 23B) and the same as S26, S27, and S28 in the second embodiment (FIG. 6). Accordingly, the effect of the nineteenth embodiment is maintained and at the same time a difference in the torque levels at a completion of the retard correction control of the ignition timing can be restricted.

Figure 25A:
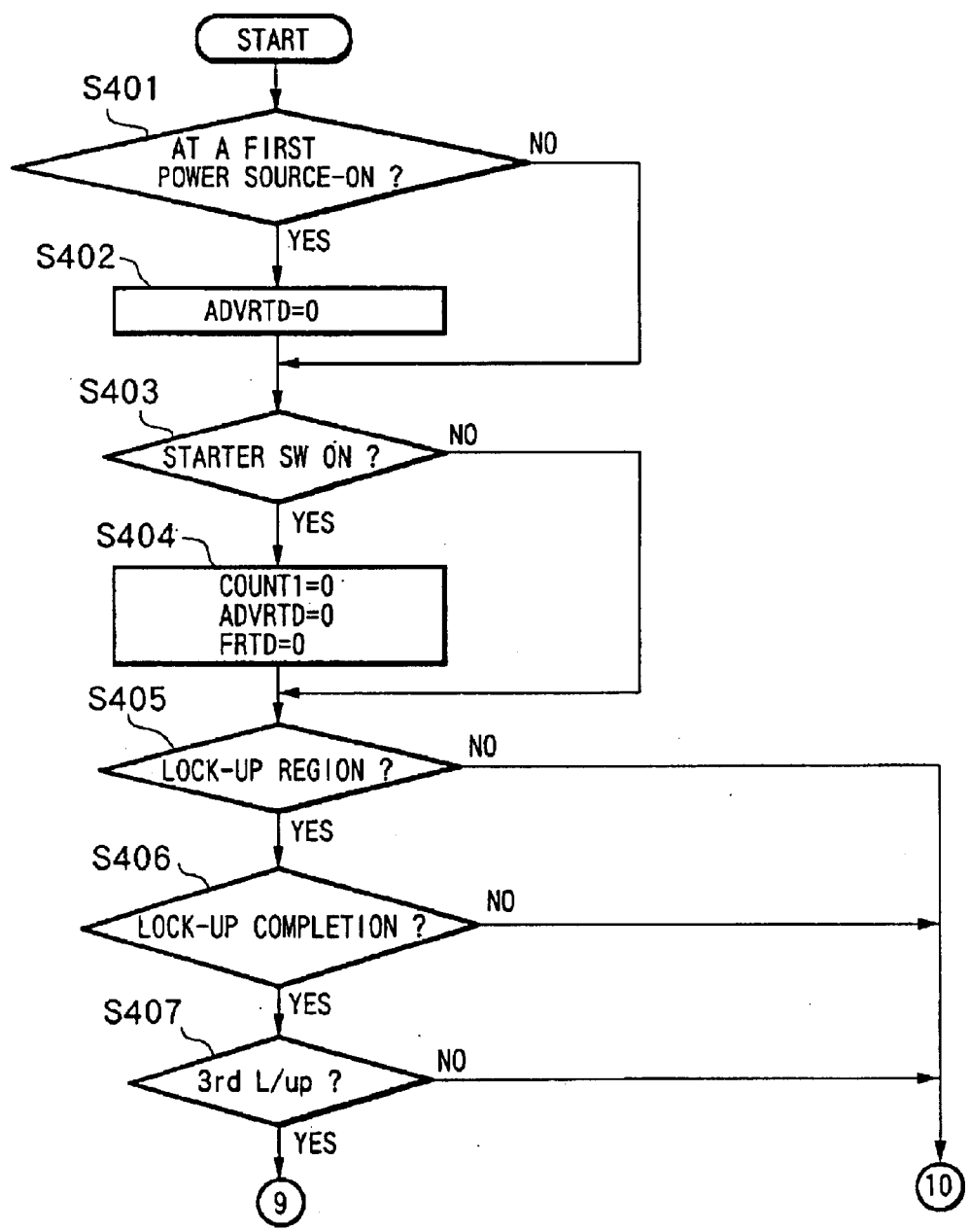
FIG. 25A and FIG. 25B are a flowchart showing a twenty first embodiment thereof.
Figure 25B:
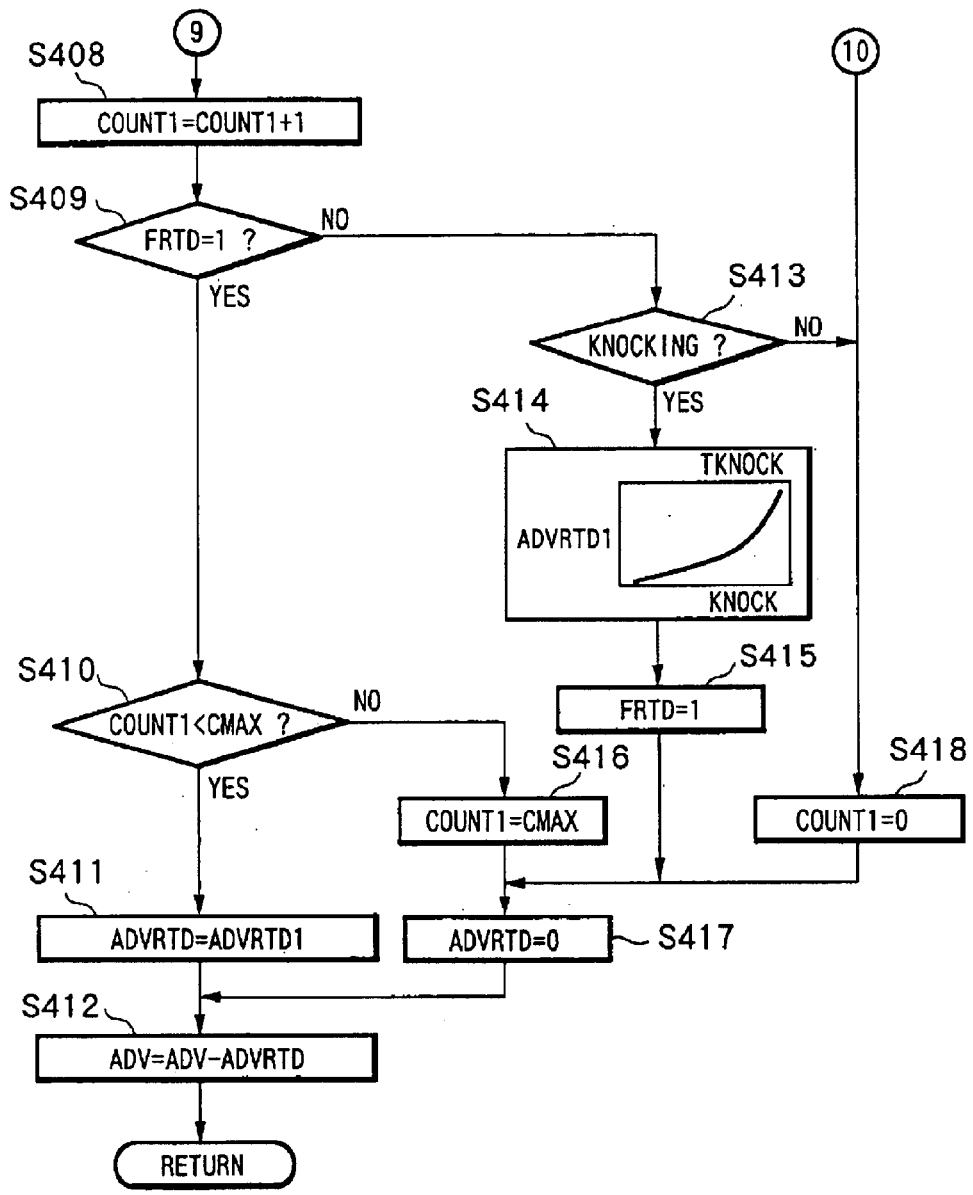

FIG. 25A and FIG. 25B are a flowchart showing a twenty first embodiment wherein, in the same manner as in the fifth embodiment, the judgement flag FRTD is set without performing the retard correction of the ignition timing at a first knocking judgement and, following the first knocking judgement, the retard correction of the ignition timing is performed by confirming the judgement flag FRTD.

However, this embodiment is different from the fifth embodiment in that the ignition timing retard quantity is set corresponding to a level of a knocking judgement value (knocking level) KNOCK.

In detail, as shown in FIGS. 25A and 25B, this technique differs from the fifth embodiment (FIG. 9) in that at S401 and S402, the setting value, ADVRTD1 of the ignition timing retard quantity is initialized at the first power source-on and at S414, the ignition timing retard quantity is set by a table retrieval based upon the knocking judgement value KNOCK and the other steps are the same as in the fifth embodiment. A detection value of vibration sensor 36 can be used as the knocking judgement value KNOCK and a table TKNOCK is made by determining a relationship between the detection value of vibration sensor 36 and the optimal ignition timing retard quantity by experiments in advance. Accordingly, since when the knocking judgement value KNOCK is large, that is, when the knocking level is bad, the ignition timing retard quantity can be set as a large value, and the knocking can be earlier and effectively avoided.

Figure 26A:
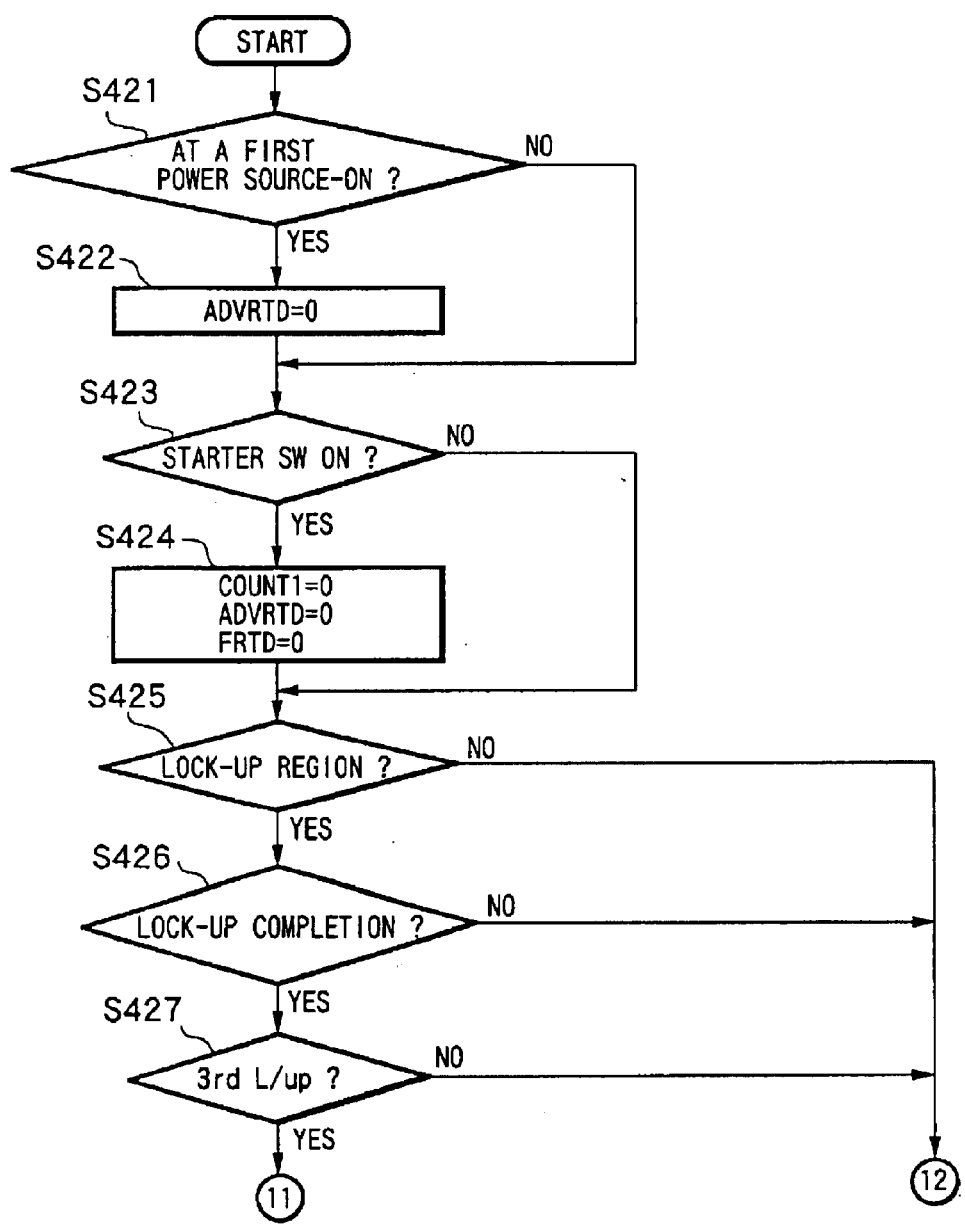
FIG. 26A and FIG. 26B are a flowchart showing a twenty second embodiment thereof.
Figure 26B:
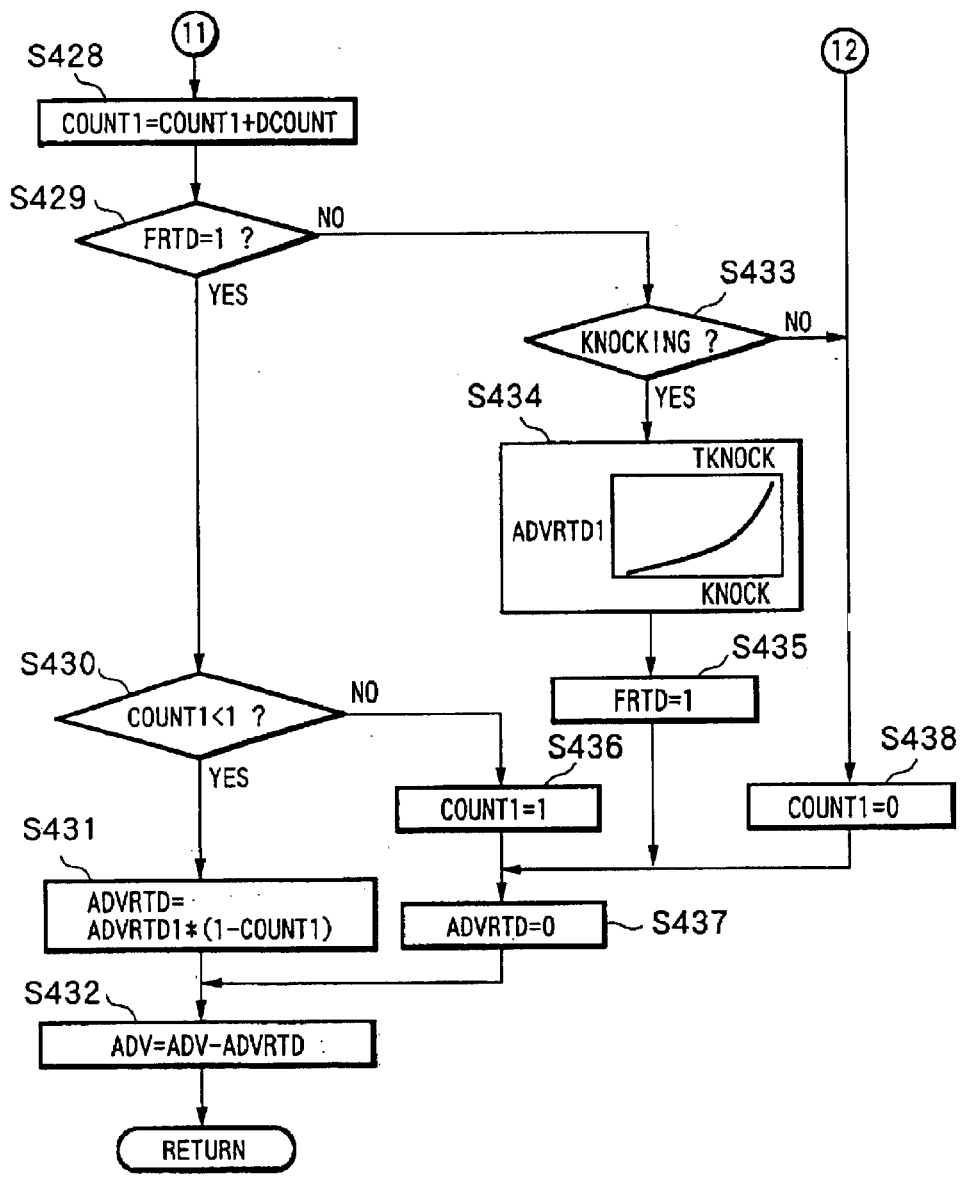

FIG. 26A and FIG. 26B are a flowchart showing a twenty second embodiment and differs from the twenty first embodiment in reducing a retard correction quantity of the ignition timing corresponding to an elapse time from the lock-up completion. In detail, as shown in FIGS. 26A and 26B, S431 is different from the twenty first embodiment (FIGS. 25A and 25B) and the same as S27 and S28 in the second embodiment (FIG. 6). Accordingly, the effect of the twenty first embodiment is maintained and at the same time a difference in the torque levels at a completion of the retard correction control of the ignition timing can be restricted.

Figure 27A:
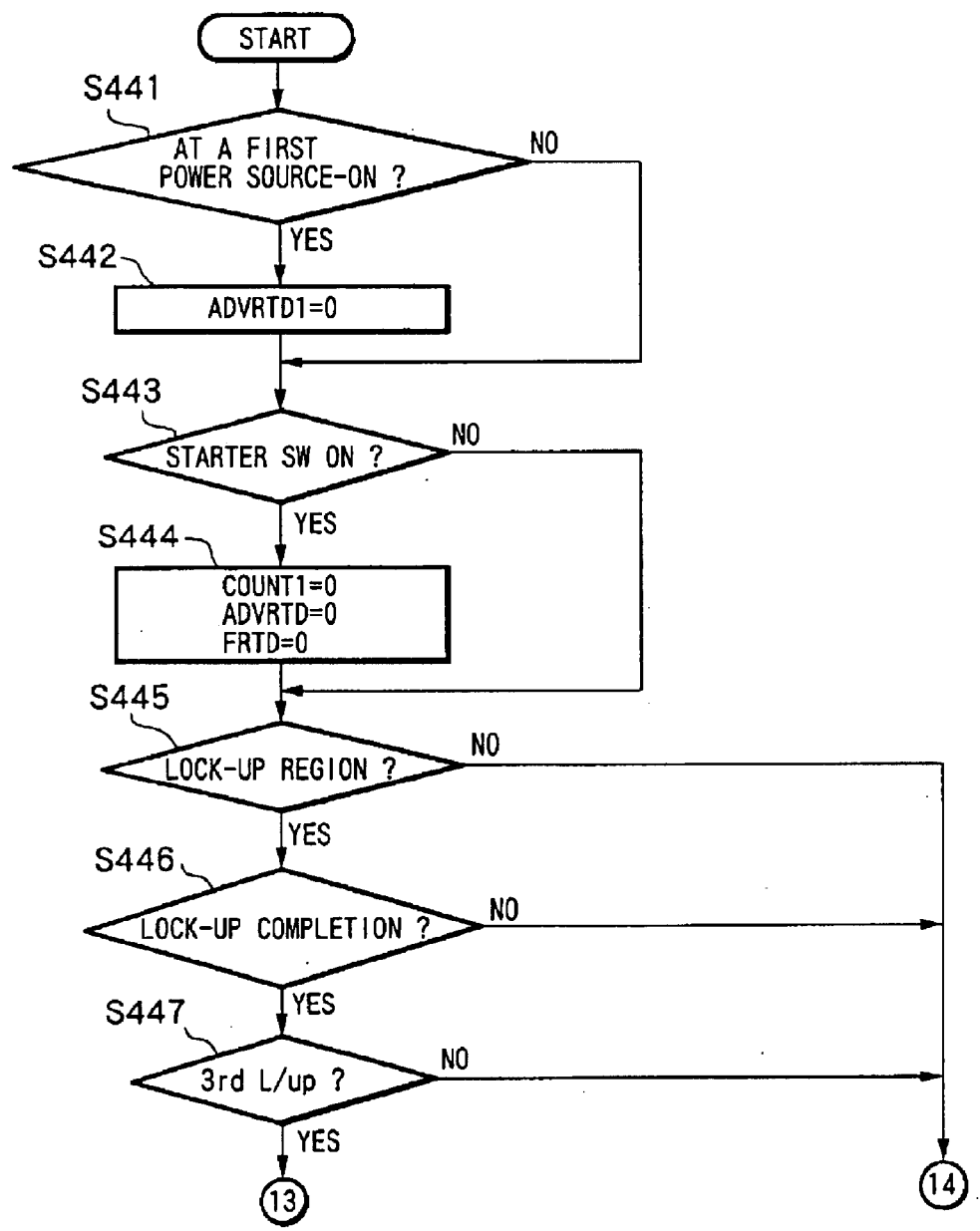
FIG. 27A and FIG. 27B are a flowchart showing a twenty third embodiment thereof.
Figure 27B:
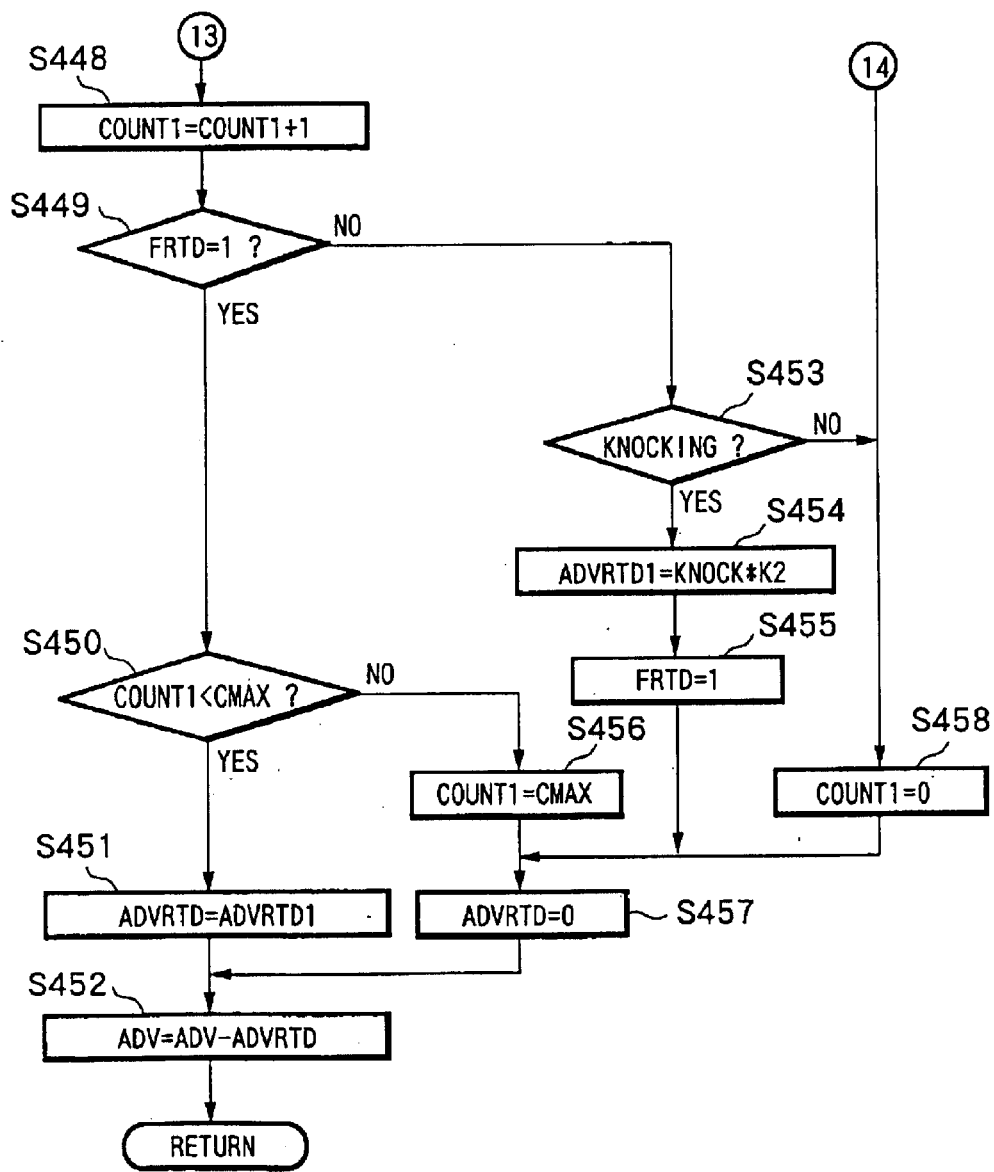

FIG. 27A and FIG. 27B are a flowchart showing a twenty third embodiment and differs from the twenty second embodiment in that the ignition timing retard quantity ADVRTD is set by multiplying the knocking judgement value KNOCK and an ignition timing retard coefficient K2 without a table retrieval. In detail, as shown in FIGS. 27A and 27B, at S454, this embodiment differs from the twenty first embodiment (FIGS. 25A and 25B) in that the setting value ADVRTD1 of the ignition timing retard quantity is calculated as the knocking judgement value KNOCK×the ignition timing retard coefficient K2. The other steps are the same as in the twenty first embodiment. Accordingly, due to elimination of the table TKNOCK, simplification of the program and the system is possible. The ignition timing retard coefficient K2 used is determined by experiments in advance.

Figure 28A:
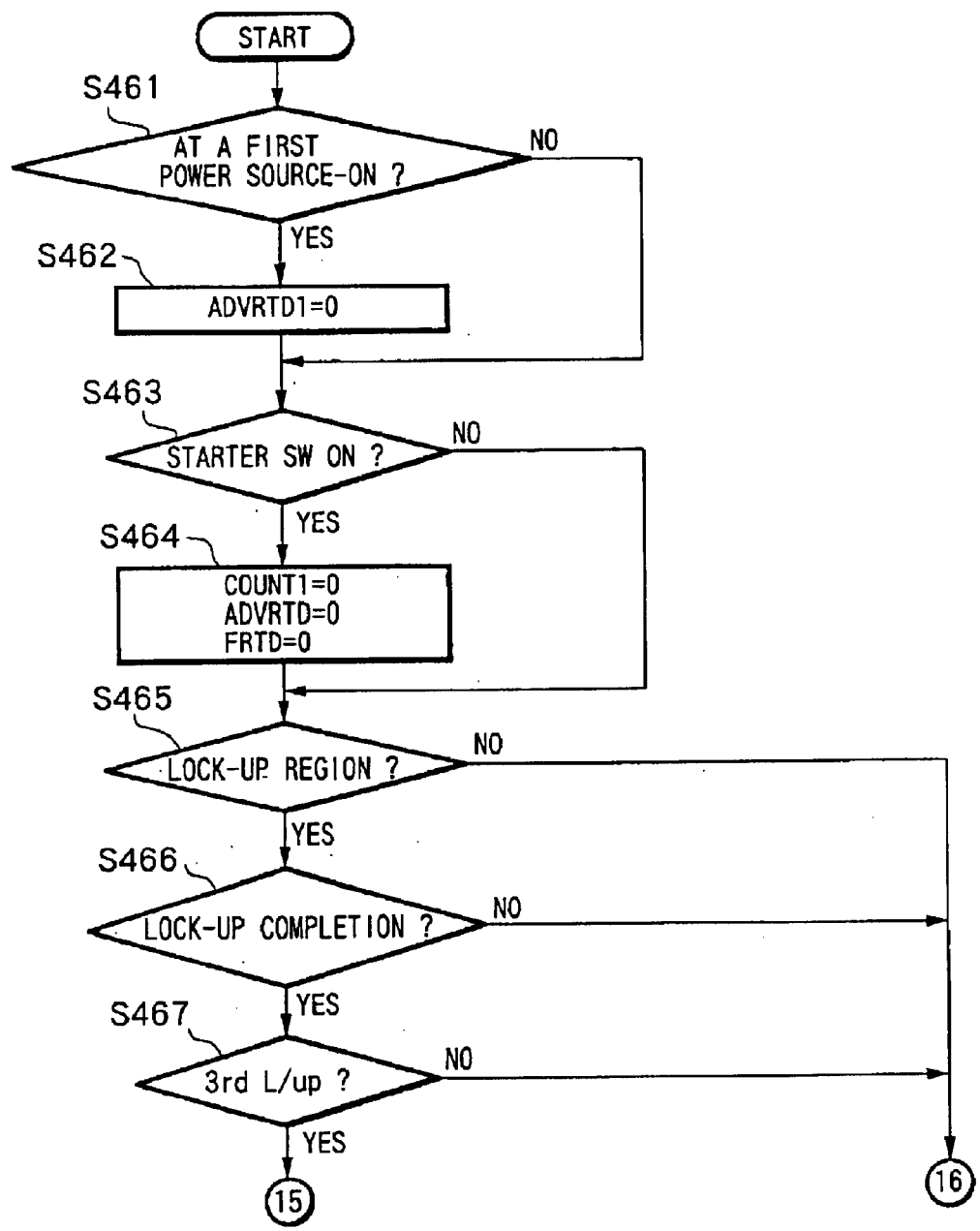
FIG. 28A and FIG. 28B are a flowchart showing a twenty fourth embodiment thereof.
Figure 28B:
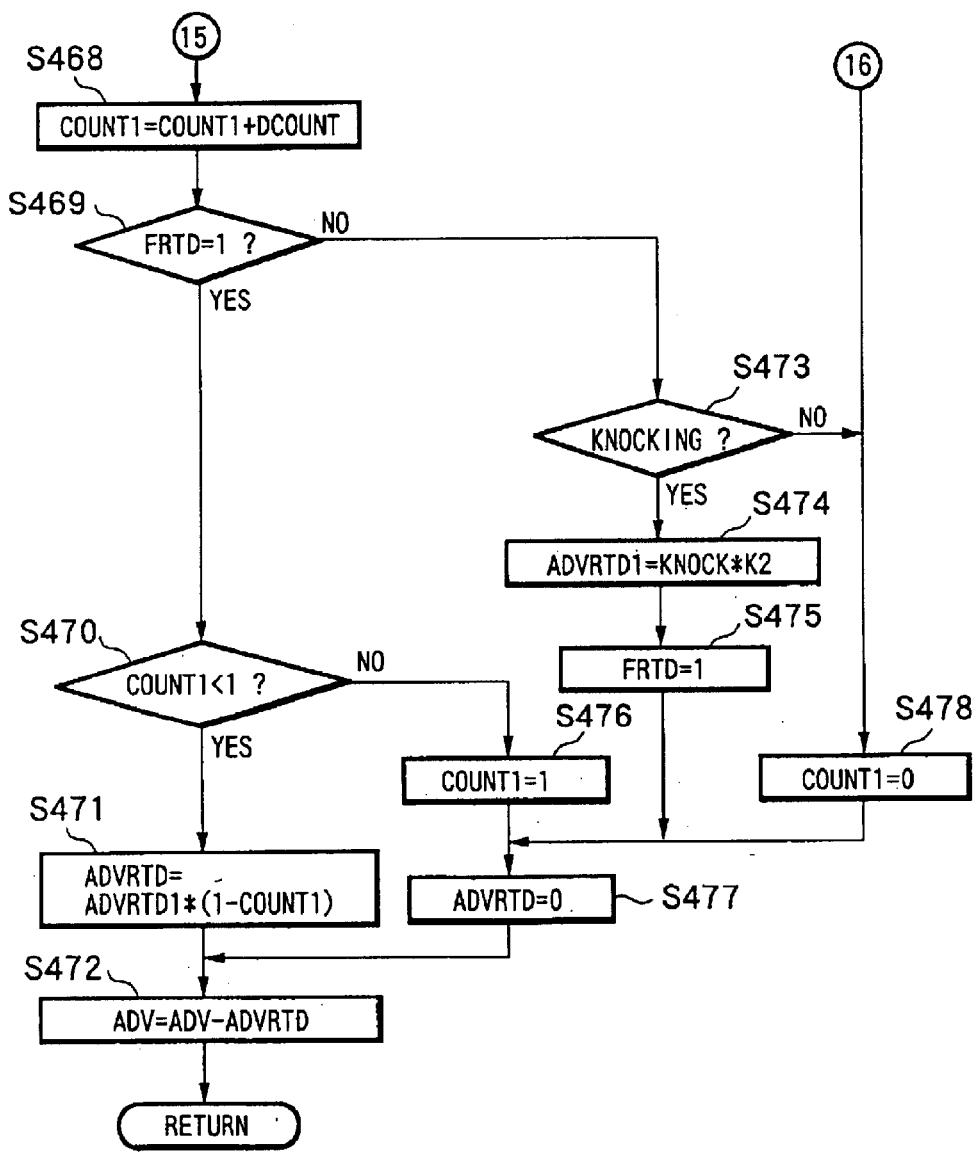

FIG. 28A and FIG. 28B are a flowchart showing a twenty fourth embodiment and differs from the twenty third embodiment in reducing a retard correction quantity of the ignition timing corresponding to an elapse time from the lock-up completion. In detail, as shown in FIGS. 28A and 28B, S468, S470, and S471 are different from the twenty third embodiment (FIGS. 27A and 27B) and the same as S26, S27, and S28 in the second embodiment (FIG. 6). Accordingly, the effect of the twenty third embodiment is maintained and at the same time a difference in the torque levels at a completion of the retard correction control of the ignition timing can be restricted.

Figure 29B:
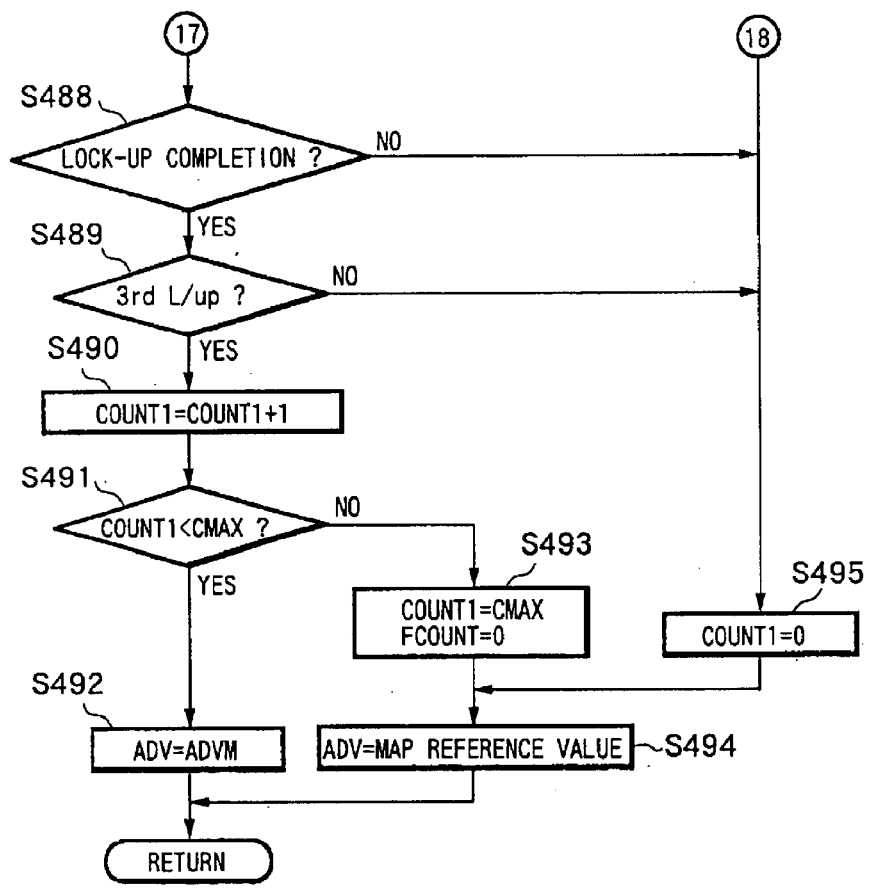

FIG. 29A and FIG. 29B are a flowchart showing a twenty fifth embodiment wherein ignition timing set based upon engine conditions immediately before a lock-up is stored and is set as ignition timing immediately after the lock-up. Namely, a condition immediately after the lock-up is a lower rotation—higher load compared to a condition immediately before the lock-up and therefore, the ignition timing is relatively advanced. Accordingly, the ignition timing immediately before the lock-up is stored and is set as the ignition timing immediately after the lock-up and thereby, a retard correction control of the ignition timing immediately after the lock-up is performed. The memory of the ignition timing is made in a memory portion included as software in control unit 30.

In FIGS. 29A and 29B, at S481, it is judged whether or not a starter switch is on and when the starter switch is on, the process goes to S482 wherein initial settings for the retard continuing time count value COUNT1, the ignition timing memory flag FCOUNT and the ignition timing memory value ADVM are made.

At S483, it is judged whether or not an engine running state is in a lock-up region. When the running state is in the lock-up region, the process goes to S484 wherein it is judged whether or not a lock-up control has started and when it has started, the process goes to S485. When it is not in the lock-up region, or when it is in the lock-up region, but the lock-up has not started, the retard continuing time count value COUNT1 is set as 0 and ignition timing is a regular map reference value (S483 or S484→S495→S494).

At S485, it is judged whether or not an ignition timing memory flag FCOUNT is set. If the ignition timing memory flag FCOUNT is 0, since the ignition timing memory flag FCOUNT is not set, the process goes to S486 wherein the ignition timing ADV immediately after the judgement is stored and is set as the ignition timing memory value ADVM and at S487, the ignition timing memory flag FCOUNT is set (FCOUNT=1).

On the other hand, if the ignition timing memory flag FCOUNT is not 0 (=1), since the ignition timing memory value ADVM is already set, the process goes to S488 wherein it is judged whether or not a lock-up is completed. When the lock-up is completed, the process goes to S489 wherein it is judged whether or not it is a third look-up and when it is judged to be the third lock-up, the process goes to S490. When the lock-up is not completed or when the completed lock-up is not the third lock-up, the retard continuing time count value COUNT1 is set as 0 and the ignition timing is a regular map reference value (S488 or S489→S495→S494).

At S490, the retard continuing time count value COUNT1 is counted up. At S491, it is judged whether or not the retard continuing time count value COUNT1 is smaller than a retard maximum time count value CMAX. When the retard continuing time count value COUNT1 is smaller than the retard maximum time count value CMAX, the process goes to S492 wherein the ignition timing memory value ADM is set as ignition timing. On the other hand, when the retard continuing time count value COUNT1 is larger than the retard maximum time count value CMAX, since the time to perform the retard correction of the ignition timing has already elapsed, the retard continuing time count value COUNT1 is set as CMAX and the ignition timing memory flag FCOUNT is lifted (FCOUNT=0), and the ignition timing is a regular map reference value. (S491→S493→S494).

Accordingly, the retard correction control of the ignition timing is made immediately after the lock-up and as a result, the knocking occurrence due to combustion instability and rapid combustion fluctuation possibly taking place immediately after the lock-up is avoided. In case the retard correction control of the ignition timing is performed prior to this control even at a lock-up transition state immediately before the lock-up in order to restrict a jolt at the lock-up, the above fifth retard correction control is performed (see FIG. 4C). In this case, the ignition timing memory value ADVM is the ignition timing (namely, map reference value) set based upon a state immediately before the retard correction control of the ignition timing during the lock-up transition state.

Figure 30B:
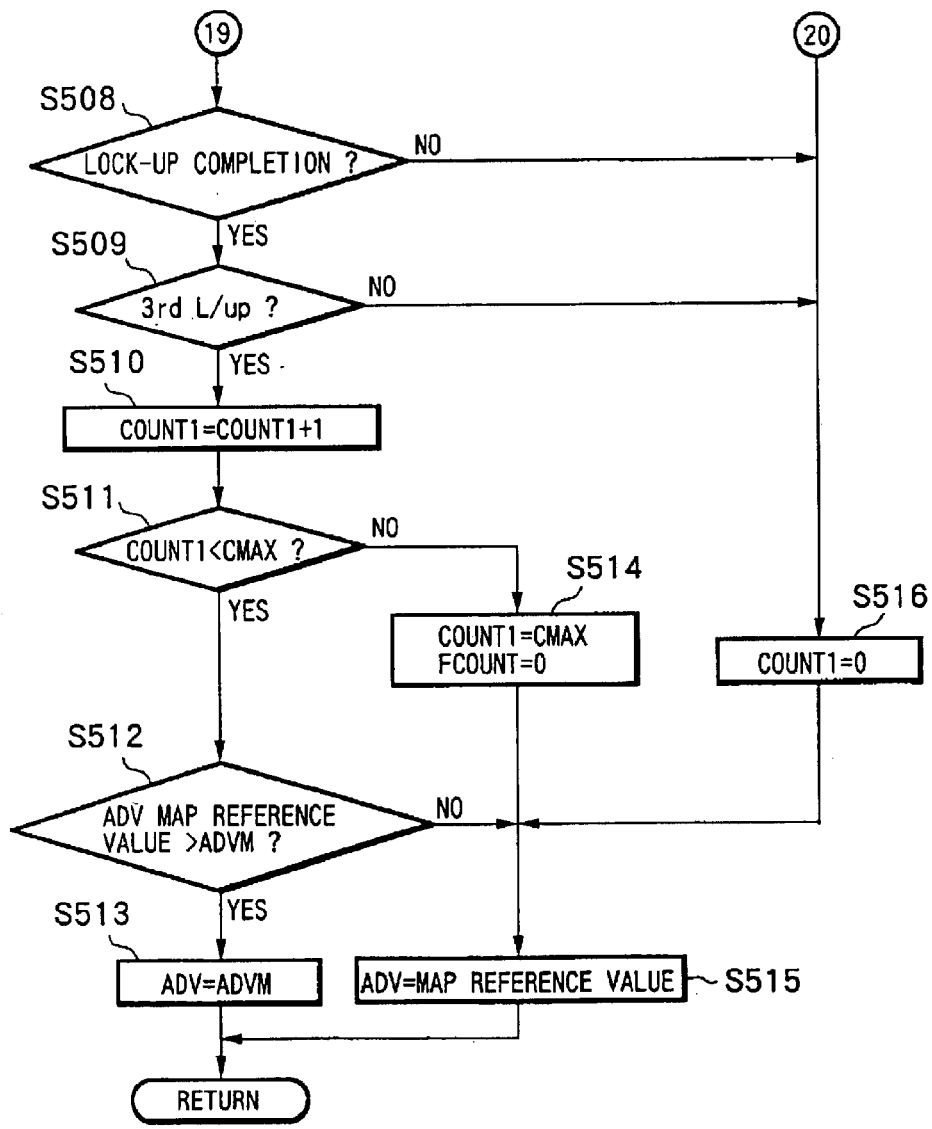

FIG. 30A and FIG. 30B are a flowchart showing a twenty sixth embodiment which differs from the twenty fifth embodiment in that only when the ignition timing memory value ADVM is on the more retarded side than the ignition timing normally set at the lock-up completion, the ignition timing memory value ADVM is set as the ignition timing immediately after the lock-up completion. In detail, as shown in FIGS. 30A and 30B, S512 wherein ignition timing (map reference value) set based upon a state at the lock-up and the ignition timing memory value ADVM are compared is added.

Namely, at S512, the map reference value of the ignition timing and the ignition timing memory value ADVM are compared. Only when the ignition timing memory value ADVM is more retarded than the map reference value, the process goes to S513 wherein the ignition timing memory value ADVM is set as the ignition timing immediately after the lock-up.

Accordingly, it is properly prevented that the ignition timing is controlled to be in the advance side when the ignition timing memory value is used as the ignition timing immediately after the lock-up.

Figure 31B:
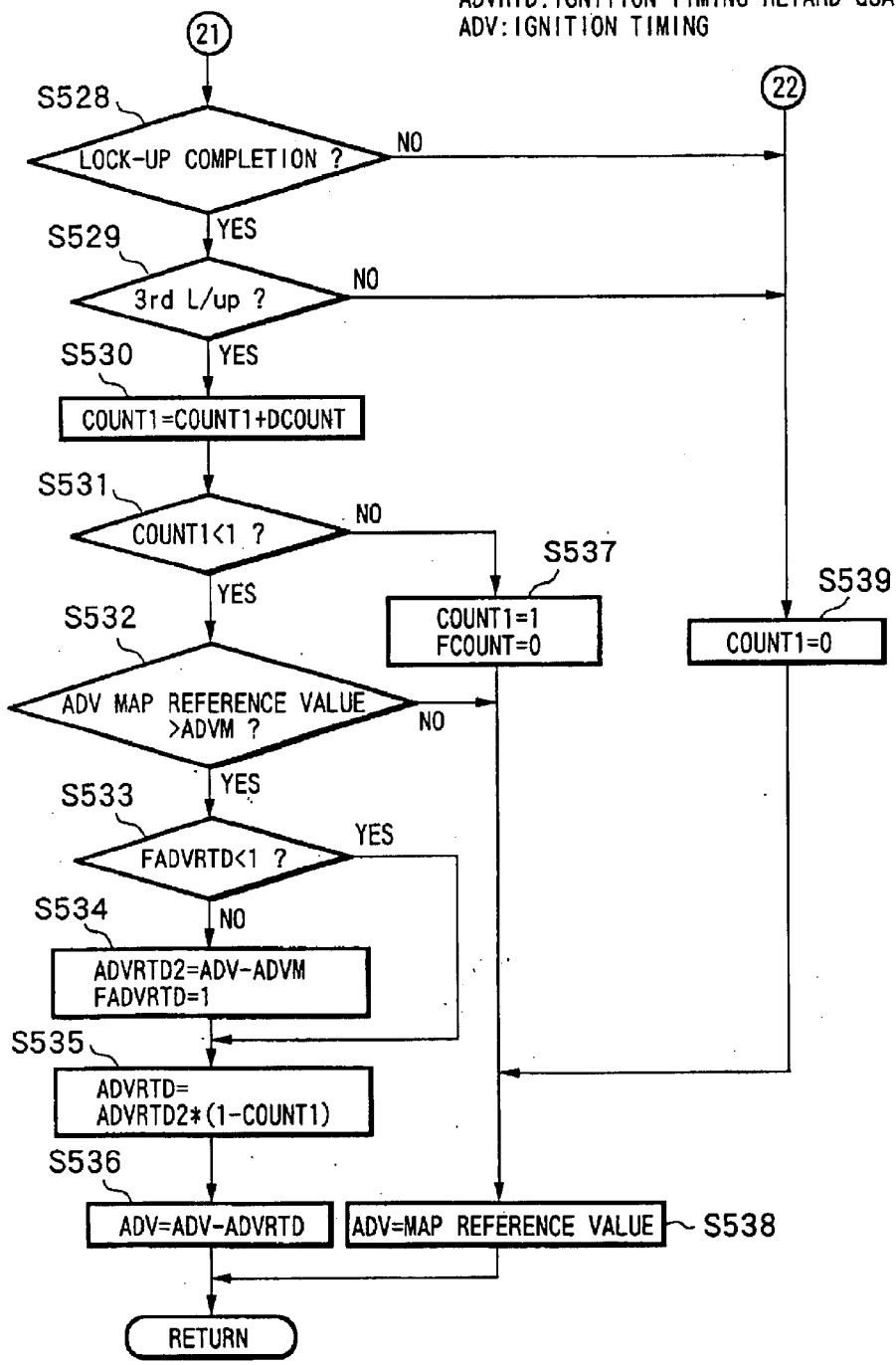

FIG. 31A and FIG. 31B are a flowchart showing a twenty seventh embodiment which differs from the twenty fifth embodiment in that only when case the ignition timing memory value ADVM is on the more retarded side than the ignition timing normally set at the lock-up completion, the ignition timing memory value ADVM is set as the ignition timing immediately after the lock-up completion and the ignition timing gradually advances with an elapse time after the lock-up completion (namely, the retard correction quantity is made small). In this embodiment, the ignition timing memory value ADVM is subtracted from the ignition timing (map reference value) set based upon the state at the lock-up and thereby, the retard correction quantity of the ignition timing immediately after lock-up is calculated and is made smaller along with the elapse time after lock-up completion. In detail, as shown in FIGS. 31A and 31B, the embodiment differs from the twenty fifth embodiment in the initial setting of the ignition timing retard quantity ADVRTD at S522 and in S530–S538. The other steps are the same. Namely, at S529, when it is the third lock-up, the process goes to S530 wherein a retard reduction coefficient DCOUNT is added to the retard continuing time count value COUNT1 (0<DCOUNT<1).

At S531, it is judged whether or not the retard continuing time count value COUNT1 after the addition is smaller than 1 (=a retard maximum time count value CMAX). When the retard continuing time count value COUNT1 is smaller than the retard maximum time count value of 1, the process goes to S532. On the other hand, when the retard continuing time count value COUNT1 is larger than the retard maximum time count value of 1, since the time to perform the retard correction of the ignition timing has already elapsed, the retard continuing time count value COUNT1 is set as 1 and the ignition timing memory flag FCOUNT is lifted (FCOUNT=0), and the ignition timing is a regular map reference value, (S531→S537→S538).

At S532, the ignition timing (map reference value) normally set at the lock-up completion and the ignition memory value ADVM are compared. When the ignition timing memory value ADVM is more retarded than the map reference value, the process goes to S533 and when ADVM is more advanced, the process goes to S538 wherein normal ignition timing is set in reference to the map.

At S533, it is judged whether or not an ignition timing retard quantity setting flag FADVRTD (FADVRTD=1) is set. When the ignition timing retard quantity setting flag FADVRTD is set, since the ignition timing retard quantity ADVRTD is already set, the process goes to S535 and when the ignition timing retard quantity setting flag FADVRTD is not set, the process goes to S534 wherein the ignition timing retard quantity setting value ADVRTD2 is set by the ignition timing memory value ADVM from ignition timing (map reference value) normally set and the ignition timing retard quantity setting flag FADVRTD is set as 1.

At S535, the ignition timing retard quantity ADVRTD is calculated by the ignition timing retard quantity setting flag ADVRTD2× (1–the retard continuing time count value COUNT1), and at S536, the ignition timing retard quantity ADV (map reference value) calculated from ignition timing normally set is subtracted, which is set as ignition timing.

Accordingly, a difference in torque levels at the retard correction completion of the ignition timing is restricted and the torque is smoothly transmitted while maintaining the effects of the twenty fifth and twenty sixth embodiments, and the driveability improves.

When the retard control of the ignition timing is performed at the lock-up transition state prior to the control according to the embodiment, this control technique is the same as the sixth retard correction control (FIG. 4F).

In summary, the embodiments representative of the invention are explained, but the invention is not limited to these embodiments and more accurate control may be performed by a proper combination of these embodiments.

The entire contents of a basic Japanese Patent Application No. 2001-336725, filed Nov. 1, 2001 to which priority is claimed are incorporated herein by reference.

While only selected embodiments have been chosen to illustrate the present invention, it will be apparent to those skilled in the art from this disclosure that various change and modification can be made herein without departing from the scope of the invention as defined with reference to the appended claims. Furthermore, the foregoing description of the embodiments according to the present invention are provided for illustration only, and not for the purpose of limiting the invention as defined by the appended claims and their equivalents.

What is claimed:

1. An apparatus for controlling an engine with an automatic transmission comprising:
   a torque converter included in the automatic transmission, the torque converter having a lock-up mechanism therein which directly connects an input shaft of the automatic transmission to an output thereof;
   an operating sensor unit which detects an engine operating condition;
   a control unit which sets engine ignition timing based upon the engine operating condition;
   a lock-up control unit which performs a lock-up control to directly connect the input shaft of the automatic transmission to the output thereof by driving the lock-up mechanism; and
   a knocking sensor which detects a knocking,
   wherein the control unit corrects the engine ignition timing to be retarded for a predetermined period immediately after a lock-up only when the knocking is detected.

2. An apparatus according to claim 1, wherein the control unit increases the retard correction quantity of the engine ignition timing when the knocking continues to be detected.

3. An apparatus according to claim 1, wherein the control unit returns the engine ignition timing back in an advance direction when the knocking is not detected after the knocking is detected.

4. An apparatus according to claim 1, wherein the control unit sets a retard correction quantity of the engine ignition timing based upon a knocking level detected by the knocking sensor.

5. An apparatus according to claim 1, wherein the control unit retards the engine ignition timing for the predetermined period immediately after the lock-up and also during a lock-up transition state from a start of the lock-up control to the lock-up.

6. An apparatus according to claim 1, further comprising:
a timer which counts an elapse time from the lock-up, wherein the control unit makes a retard correction quantity of the engine ignition timing smaller as the time from the lock-up gets longer.

7. An apparatus for controlling an engine with an automatic transmission comprising:
a torque converter included in the automatic transmission, the torque converter having a lock-up mechanism therein which directly connects an input shaft of the automatic transmission to an output thereof;
an operating sensor unit which detects an engine operating condition;
a control unit which sets engine ignition timing based upon the engine operating condition;
a lock-up control unit which performs a lock-up control to directly connect the input shaft of the automatic transmission to the output thereof by driving the lock-up mechanism;
wherein the engine ignition timing is corrected to be retarded for a predetermined period immediately after a lock-up; and
a timer which counts an elapse time from the lock-up, wherein the control unit makes a retard correction quantity of the engine ignition timing smaller as the time from the lock-up gets longer.

8. An apparatus for controlling an engine with an automatic transmission comprising:
a torque converter included in the automatic transmission, the torque converter having a lock-up mechanism therein which directly connects an input shaft of the automatic transmission to an output thereof;
operating condition detection means for detecting an engine operating condition;
control means for setting engine ignition timing based upon the engine operating condition;
lock-up control means for performing a lock-up control to directly connect the input shaft of the automatic transmission to the output thereof by driving the lock-up mechanism; and
knocking detection means for detecting a knocking;
wherein the control means corrects the engine ignition timing to be retarded for a predetermined period immediately after a lock-up only when the knocking is detected.

9. A method for controlling an engine with an automatic transmission comprising:
detecting an engine operating condition;
setting an engine ignition timing based upon the engine operating condition;
performing a lock-up control to directly connect an input shaft of the automatic transmission to an output shaft thereof by driving a lock-up mechanism; and
detecting a knocking;
wherein the engine ignition timing is corrected to be retarded for a predetermined period immediately after a lock-up only when knocking is detected.

* * * * *